United States Patent
Sugano et al.

(10) Patent No.: US 10,693,670 B2
(45) Date of Patent: Jun. 23, 2020

(54) INFORMATION PROCESSING APPARATUS, INFORMATION PROCESSING SYSTEM, AND INFORMATION PROCESSING METHOD

(71) Applicant: FUJITSU LIMITED, Kawasaki-shi, Kanagawa (JP)

(72) Inventors: Hiroyasu Sugano, Koto (JP); Junichi Yura, Kawasaki (JP); Koki Hatada, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/975,921

(22) Filed: May 10, 2018

(65) Prior Publication Data

US 2018/0331840 A1    Nov. 15, 2018

(30) Foreign Application Priority Data

May 12, 2017    (JP) .................................. 2017-095663

(51) Int. Cl.
*H04L 29/08*    (2006.01)
*H04L 12/18*    (2006.01)
(Continued)

(52) U.S. Cl.
CPC ...... *H04L 12/1822* (2013.01); *H04L 12/1827* (2013.01); *H04L 65/403* (2013.01);
(Continued)

(58) Field of Classification Search
CPC ................................................ H04L 12/1822
See application file for complete search history.

(56) References Cited

U.S. PATENT DOCUMENTS

2005/0144233 A1    6/2005    Kjesbu et al.
2013/0321562 A1    12/2013   Takahashi
(Continued)

FOREIGN PATENT DOCUMENTS

JP    2004-336289    11/2004
JP    2007-513537    5/2007
(Continued)

OTHER PUBLICATIONS

EESR—The Extended European Search Report of European Patent Application No. 18171610.1 dated Oct. 23, 2018.

*Primary Examiner* — Adnan M Mirza
(74) *Attorney, Agent, or Firm* — Fujitsu Patent Center

(57) ABSTRACT

An information processing apparatus includes: a memory; and a processor coupled to one or more terminals, wherein the processor: acquires, from the one or more terminals, a snapshot of shared information shared with another information processing apparatus at a time during a conference and a first identifier of the conference; determines whether or not the first identifier is stored in the memory by referring to the memory that stores a second identifier received from the another information processing apparatus; when determining that the first identifier is stored in the memory, performs coupling to the another information processing apparatus that is a source of the second identifier stored in the memory; and reproduces the shared information shared with the coupled another information processing apparatus from the snapshot.

9 Claims, 17 Drawing Sheets

(51) Int. Cl.
   *H04M 3/56*      (2006.01)
   *H04L 29/06*     (2006.01)
   *H04N 7/14*      (2006.01)
   *H04N 7/15*      (2006.01)

(52) U.S. Cl.
   CPC ............ *H04M 3/567* (2013.01); *H04N 7/147* (2013.01); *H04N 7/15* (2013.01)

(56) References Cited

U.S. PATENT DOCUMENTS

| | | |
|---|---|---|
| 2014/0095615 A1 | 4/2014 | Ito |
| 2014/0149865 A1* | 5/2014 | Tanaka .................... G06F 16/70 715/719 |
| 2014/0368605 A1 | 12/2014 | Liu |
| 2016/0241631 A1 | 8/2016 | Tamura |
| 2018/0139155 A1* | 5/2018 | Kurisu .................... G06F 13/00 |

FOREIGN PATENT DOCUMENTS

| | | |
|---|---|---|
| JP | 2007-288487 | 11/2007 |
| JP | 2008-090383 | 4/2008 |
| WO | 2005/041574 | 5/2005 |

\* cited by examiner

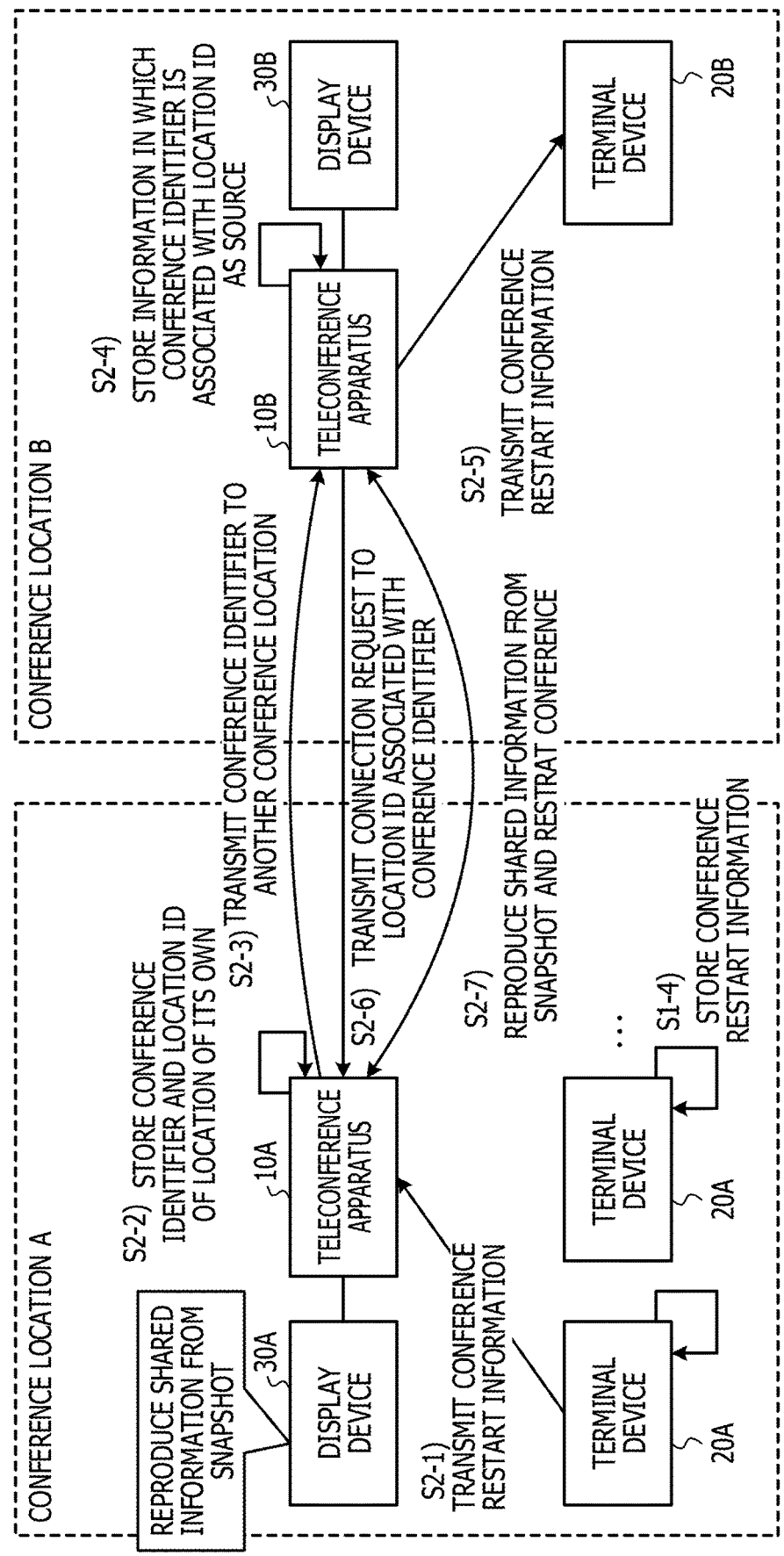

| LOCATION NAME | LOCATION ID |
|---|---|
| LOCATION B | IP ADDRESS B |
| LOCATION C | IP ADDRESS C |
| LOCATION D | IP ADDRESS D |
| ... | ... |

} OTHER LOCATION INFORMATION

FIG. 7

| CONFERENCE IDENTIFIER | LOCATION ID | CONNECTION CLASSIFICATION | RECEPTION DATE AND TIME |
|---|---|---|---|
| IDENTIFIER 1 | IP ADDRESS A | CONNECTED | DATE AND TIME 1 |
| IDENTIFIER 2 | IP ADDRESS D | UNCONNECTED | DATE AND TIME 2 |
| IDENTIFIER 3 | IP ADDRESS F | UNCONNECTED | DATE AND TIME 3 |
| ... | ... | ... | ... |

107

CONFERENCE MANAGEMENT INFORMATION

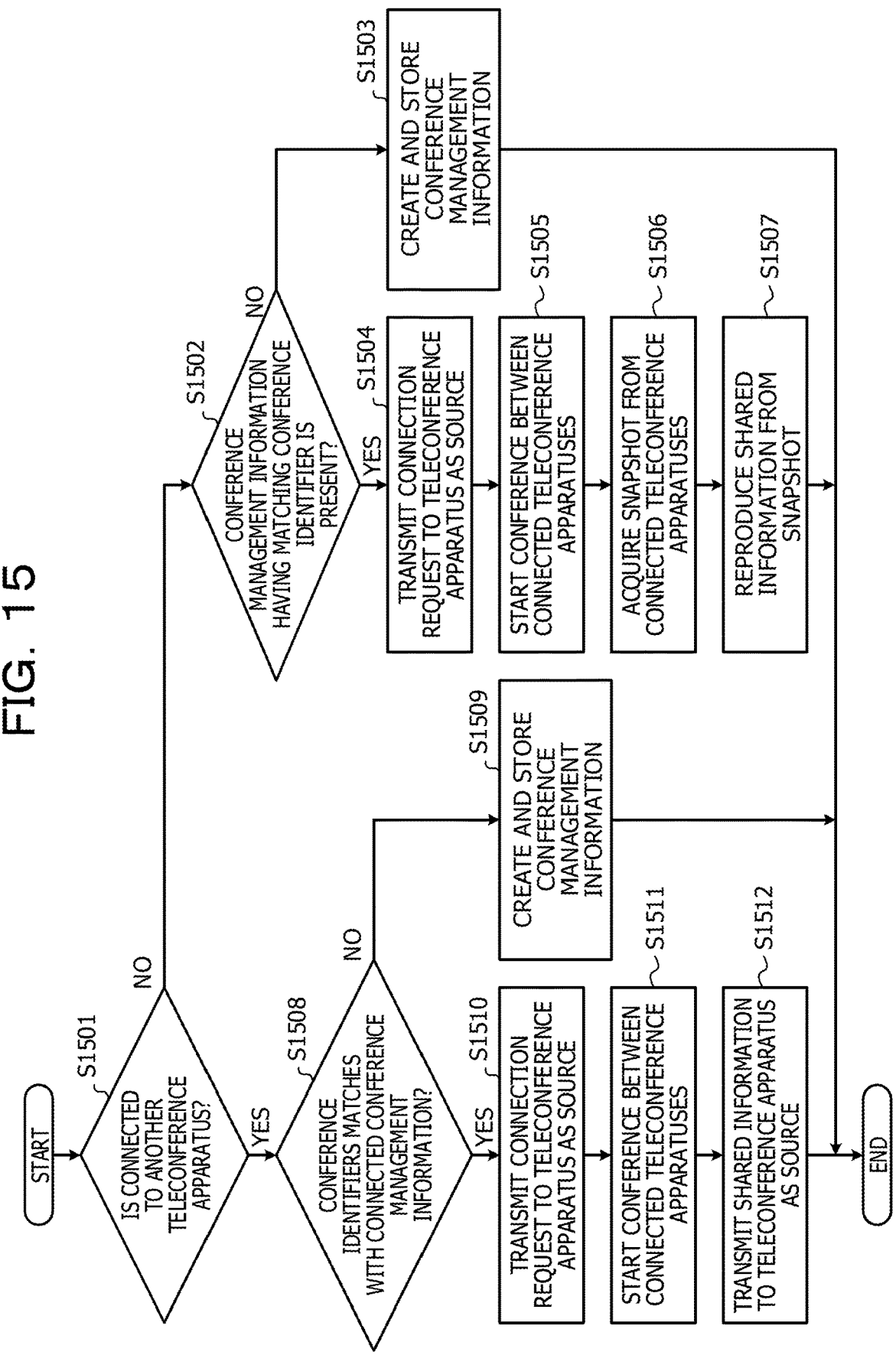

INFORMATION PROCESSING APPARATUS, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2017-095663, filed on May 12, 2017, the entire contents of which are incorporated herein by reference.

FIELD

The embodiments discussed herein are related to an information processing apparatus, an information processing system, and an information processing method.

BACKGROUND

In a teleconference system, discrete locations are interconnected via a communication network to hold a conference between the locations. In such a teleconference system, teleconference apparatuses installed at the locations are interconnected to hold the conference between the locations.

A related technique is disclosed in Japanese Laid-open Patent Publication Nos. 2007-288487, 2004-336289, and 2008-090383, and Japanese National Publication of International Patent Application No. 2007-513537.

SUMMARY

According to an aspect of the embodiments, an information processing apparatus includes: a memory; and a processor coupled to one or more terminals, wherein the processor: acquires, from the one or more terminals, a snapshot of shared information shared with another information processing apparatus at a time during a conference and a first identifier of the conference; determines whether or not the first identifier is stored in the memory by referring to the memory that stores a second identifier received from the another information processing apparatus; when determining that the first identifier is stored in the memory, performs coupling to the another information processing apparatus that is a source of the second identifier stored in the memory; and reproduces the shared information shared with the coupled another information processing apparatus from the snapshot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2B illustrates an example of processing of the teleconference system at restart of the conference;

FIG. 6 illustrates an example of location information stored in a location information storage unit;

FIG. 7 illustrates an example of conference management information stored in a conference management information storage unit;

FIG. 15 illustrates an example of conference restart processing in the case of receiving the conference identifier from the teleconference apparatus at another location.

DESCRIPTION OF EMBODIMENTS

For example, conference participants connect their terminal devices such as smart phones or notebook PCs to a teleconference apparatus, thereby sharing various information including electronic files stored in the terminal devices and notes (annotations) about the electronic files. As an example, the conference participants may edit such information including the electronic files and notes (hereinafter referred to as "shared information").

However, for example, at restart of a terminated conference, when it is attempted to reproduce the shared information at termination of the previous conference, participants upload the shared information including electronic files and so forth shared in the previous conference into the teleconference apparatus again. For this reason, at restart of the conference, the participants take time and effort to reproduce the shared information.

For example, a method of readily reproducing shared information may be provided.

Figure 1:
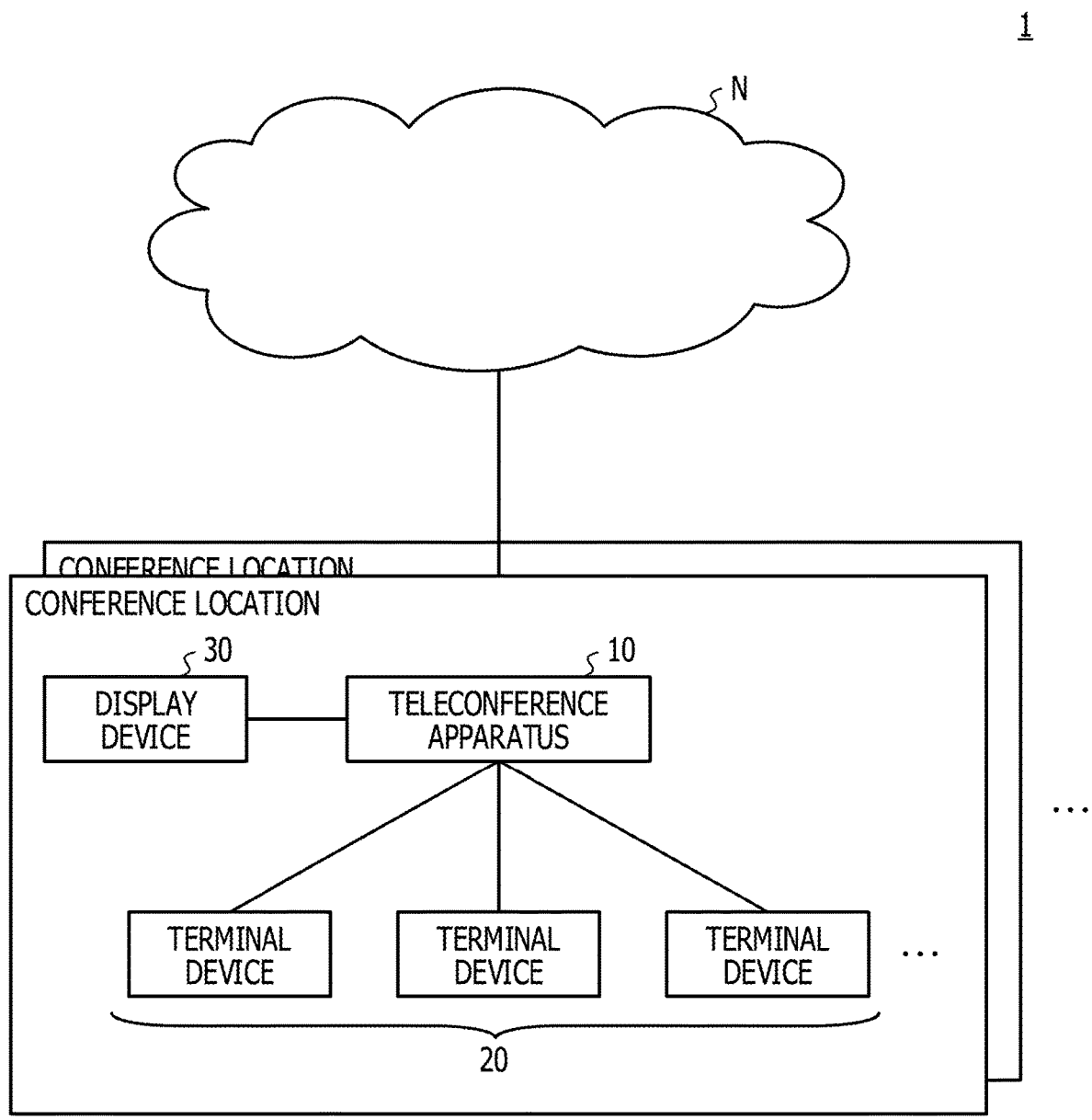
FIG. 1 illustrates an example of a teleconference system.

FIG. 1 illustrates an example of entire configuration of a teleconference system 1.

The teleconference system 1 illustrated in FIG. 1 is a computer system for holding a teleconference between a plurality of conference locations. The conference location refers to a room or partition where a below-mentioned teleconference apparatus 10 and so on are installed, for example, a conference room or a conference space. The conference location may be also referred to as "location".

The teleconference system 1 illustrated in FIG. 1 includes the teleconference apparatus 10 installed at the conference location, one or more terminal devices 20 connected to the teleconference apparatus 10, and a display device 30 connected to the teleconference apparatus 10.

The teleconference apparatus 10 is a computer that holds a teleconferences with another teleconference apparatus 10 installed at another conference location via a wide area network N such as the Internet.

The teleconference apparatus 10 may share information including electronic files such as conference materials and notes (annotations) about the conference materials with another teleconference apparatus 10. The information shared between a plurality of teleconference apparatuses 10 (shared information) is displayed on the display device 30 connected to the teleconference apparatus 10. The teleconference apparatus 10 also may output voices collected by another teleconference apparatus 10.

In this manner, conference participants may hold a conference at a plurality of conference locations while sharing conference materials, annotations, and so on. The shared information may be displayed on the terminal devices 20 used by the conference participants.

At termination of the conference, the teleconference apparatus 10 creates a snapshot for reproducing shared information acquired at termination of the conference, and a conference identifier for identifying the conference, and stores the snapshot and the conference identifier in the terminal devices 20 used by the conference participants. The conference participants may use the snapshot and the conference identifier in their terminal devices 20 to reproduce the shared information acquired at termination of the conference, restarting the terminated conference.

The terminal devices 20 are computers such as smart phones, tablet terminals, and notebook PCs that are used by the conference participants. The conference participants may use their terminal devices 20 to upload electronic files such as conference materials to the teleconference apparatus 10, sharing information including conference materials between a plurality of conference locations. The teleconference apparatus 10 is communicably connected to the terminal devices 20 via wireless local area network (LAN), Bluetooth (registered trademark), or the like.

All of the conference participants do not have to have their terminal devices 20, and in this embodiment, it is assumed that at least one conference participant has his/her terminal device 20. Accordingly, in this embodiment, when a conference is held between a plurality of conference locations, at each of the conference locations, at least one terminal device 20 is connected to the teleconference apparatus 10.

The entire configuration of the teleconference system 1 in FIG. 1 is merely an example, and may be any other suitable configuration. For example, the display device 30 may be integrated with the teleconference apparatus 10.

Figure 2A:
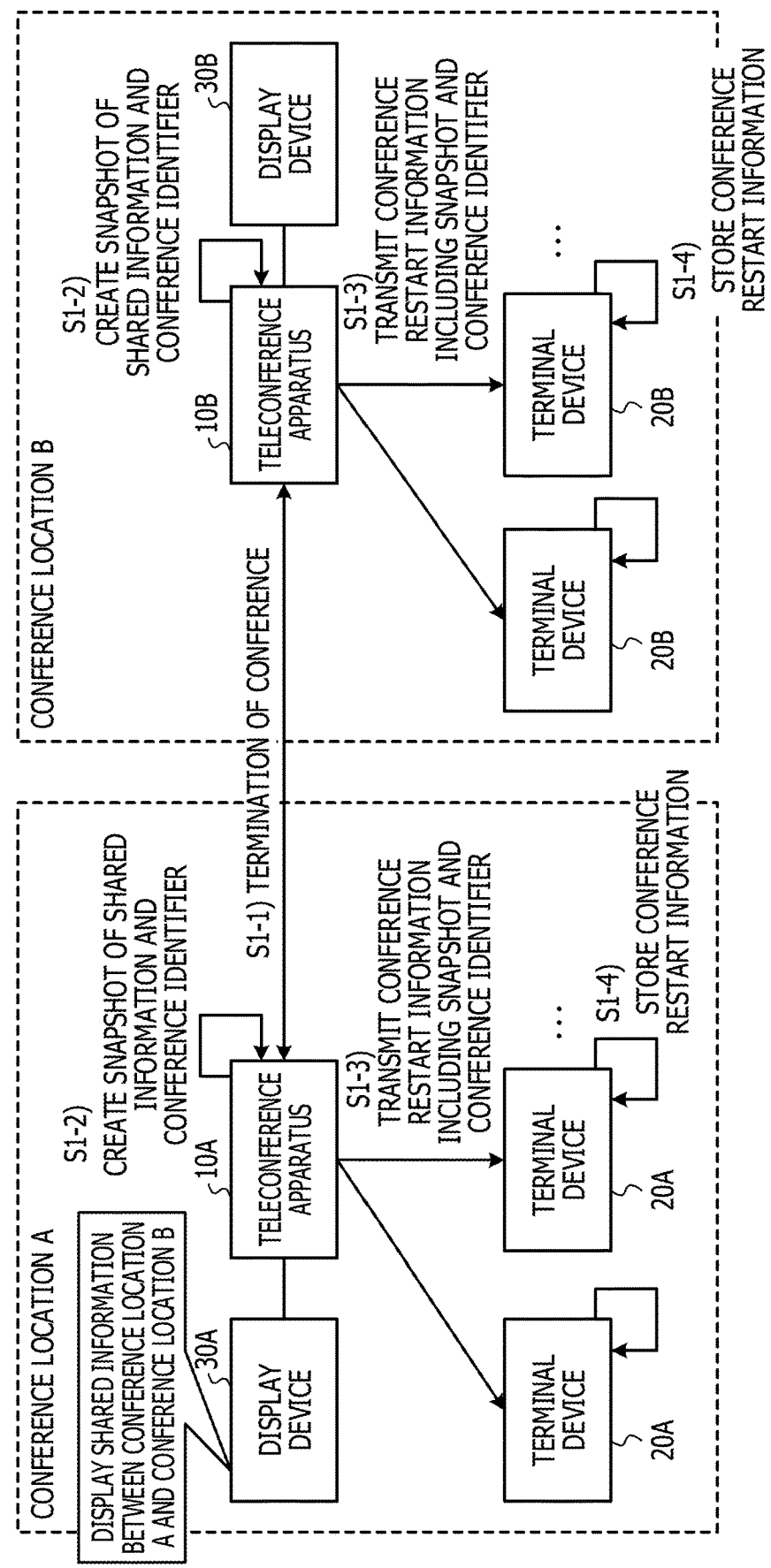
FIG. 2A illustrates an example of processing of the teleconference system at termination of a conference.

FIG. 2A illustrates the state at termination of a conference using the teleconference system 1. FIG. 2B illustrates the state at restart of a conference using the teleconference system 1.

FIGS. 2A and 2B illustrate the case where a conference held between a conference location A and a conference location B is terminated, and the case where a conference between the location A and the conference location B is restarted, respectively. In FIGS. 2A and 2B, the teleconference apparatus 10, the terminal device 20, and the display device 30 at the conference location A are referred to as "teleconference apparatus 10A", "terminal device 20A", and "display device 30A", respectively. Similarly, the teleconference apparatus 10, the terminal device 20, and the display device 30 at the conference location B are referred to as "teleconference apparatus 10B", "terminal devices 20B", and "display device 30B", respectively.

The display device 30A at the conference location A and the display device 30B at the conference location B display shared information on the conference held between the conference location A and the conference location B.

S1-1) At this time, it is assumed that the teleconference apparatus 10A and the teleconference apparatus 10B terminate the conference. For example, the participants at the conference location A or the conference location B may perform a conference termination operation to terminate the conference. At this time, it is confirmed that shared information completely match each other between the locations, and when the shared information do not match, processing of synchronizing and matching the shared information is executed.

S1-2) When the conference between the conference location A and the conference location B is terminated, the teleconference apparatus 10A and the teleconference apparatus 10B create the snapshot of the shared information and the conference identifier.

The snapshot refers to various information requested for reproducing shared information at termination of the conference, for example, an electronic file shared between the plurality of teleconference apparatuses 10, notes on the electronic file, displayed positions of the electronic file and notes on the display device 30. The conference identifier is information for identifying a terminated conference, for example, a value acquired by calculating a predetermined hash function with respect to the snapshot (ex. a hash value of the snapshot).

The teleconference apparatus 10A and the teleconference apparatus 10B create the same snapshot and conference identifier.

S1-3) The teleconference apparatus 10A transmits conference restart information including the snapshot and the conference identifier to the terminal devices 20A of the participants at the conference location A. Similarly, the teleconference apparatus 10B transmits the conference restart information including the snapshot and the conference identifier to the terminal devices 20B of the participants at the conference location B.

S1-4) Each of the terminal devices 20A stores the conference restart information received from the teleconference apparatus 10A. Similarly, each of the terminal devices 20B stores the conference restart information received from the teleconference apparatus 10B.

Thereby, the participants of the conference held between the conference location A and the conference location B may use the conference restart information stored in their terminal devices 20 to restart the conference.

For example, the conference between the conference location A and the conference location B is restarted.

S2-1) For example, the terminal devices 20A of the participants at the conference location A transmit the conference restart information to the teleconference apparatus 10A.

S2-2) When the conference identifier included in the conference restart information received from the terminal devices 20A is not stored in the teleconference apparatus 10A, the teleconference apparatus 10A stores information (below-mentioned conference management information) that associates the conference identifier with a location ID for identifying its location (conference location A).

S2-3) The teleconference apparatus 10A transmits the conference identifier to another teleconference apparatus 10 at another predetermined conference location. For example, the teleconference apparatus 10A transmits the conference identifier to the teleconference apparatus 10B at the conference location B, the teleconference apparatus 10C at a conference location C, and a teleconference apparatus 10D at a conference location D.

As described above, when the conference identifier included in the conference restart information received from the terminal devices 20 is not stored in the teleconference apparatus 10, the teleconference apparatus 10 associates the conference identifier with the location ID at the location of its own and stores them, and then, transmits the conference identifier to a predetermined another conference location.

S2-4) The teleconference apparatus 10B stores information (conference management information) that associates the conference identifier received from the teleconference apparatus 10A with the location ID of a source of the conference identifier (that is, the location ID of the conference location A).

Similarly, the teleconference apparatus 10C at the conference location C and the teleconference apparatus 10D at the conference location D store the information that associates the conference identifier received from the teleconference apparatus 10A with the location ID of the conference location A.

S2-5) For example, the terminal devices 20B of the participants at the conference location B transmit the conference restart information to the teleconference apparatus 10B. At this time, the terminal devices 20B transmit the same conference restart information as the conference restart information transmitted from the terminal devices 20A to the teleconference apparatus 10A in above-mentioned S2-1.

S2-6) When the conference identifier included in the conference restart information received from the terminal devices 20B is stored in the teleconference apparatus 10B, the teleconference apparatus 10B transmits a connection request to the location ID that is associated with the conference identifier and stored (for example, the location ID of the conference location A). Thereby, the teleconference apparatus 10A at the conference location A is connected to the teleconference apparatus 10B at the conference location B. Through the connection between the teleconference apparatus 10A and the teleconference apparatus 10B, a conference may be held between the conference location A and the conference location B.

As described above, when the conference identifier included in the conference restart information received from the terminal devices 20 is stored in the teleconference apparatus 10, the teleconference apparatus 10 transmits the connection request to the location ID that is associated with the conference identifier and stored.

S2-7) For example, the teleconference apparatus 10B and the teleconference apparatus 10A reproduce the shared information from the snapshot included in the conference restart information received from the terminal devices 20A, and restart the conference. For example, the teleconference apparatus 10B and the teleconference apparatus 10A may reproduce the shared information from the snapshot included in the conference restart information received from the terminal devices 20B.

Thereby, the plurality of teleconference apparatuses 10 may reproduce the shared information at termination of the conference and then, restart the conference. Thereby, the conference participants may restart the conference without uploading the electronic file such as conference materials into the teleconference apparatus 10. Since notes on the conference materials, the display positions of the conference materials, and so forth are reproduced, the conference participants may easily restart discussion at termination of the previous conference.

Among the plurality of teleconference apparatuses 10, the teleconference apparatuses 10 having the same conference identifier received from the terminal devices 20 are interconnected to restart the conference. For example, matching between the plurality of teleconference apparatuses 10 is performed using the conference identifiers received from the terminal devices 20, and the teleconference apparatuses 10 receiving the same conference identifier are interconnected.

Thereby, for example, even when this conference location is different from the previous conference location, the conference may be readily restarted between the matched teleconference apparatuses 10. Similarly, for example, even when the number of participants increases immediately before the restart of the conference, resulting in that the number of conference locations increases or the conference locations change, the conference may be readily restarted between the matched teleconference apparatuses 10.

Figure 3:
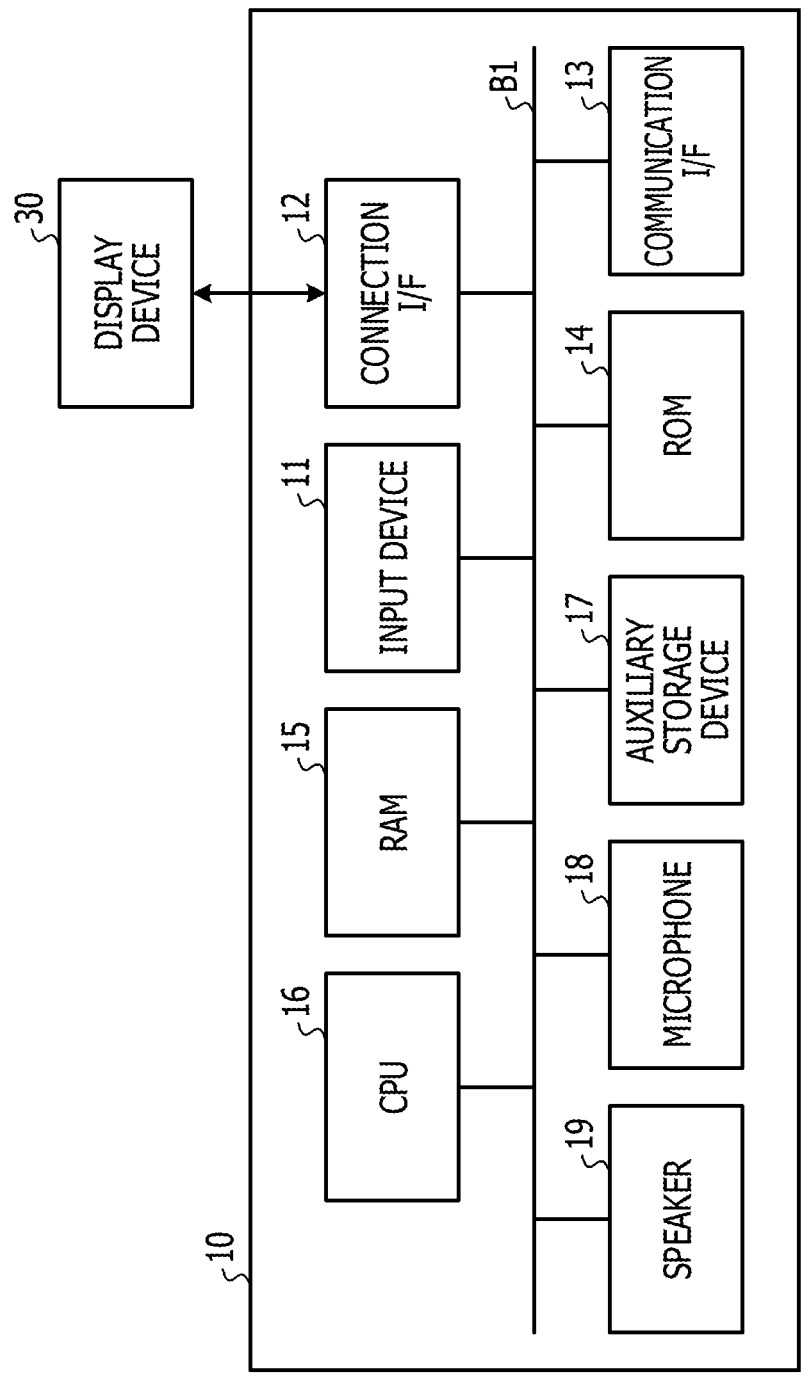
FIG. 3 illustrates an example of hardware configuration of a teleconference apparatus.

FIG. 3 illustrates an example of hardware configuration of the teleconference apparatus 10.

The teleconference apparatus 10 illustrated in FIG. 3 includes an input device 11, a connection I/F 12, a communication I/F 13, and a read only memory (ROM) 14. The teleconference apparatus 10 illustrated in FIG. 3 further includes a random access memory (RAM) 15, a central processing unit (CPU) 16, an auxiliary storage device 17, a microphone 18, and a speaker 19. Each of the hardware components are interconnected via a bus B1.

The input device 11 is, for example, a touch panel or various switches, and is used to input various operational signals to the teleconference apparatus 10. The input device 11 may include a remote controller that inputs various operational signals to the teleconference apparatus 10. The touch panel may be integrated with the display device 30.

The connection I/F 12 is an interface for connection between the teleconference apparatus 10 and the display device 30.

The communication I/F 13 is an interface for connection between the teleconference apparatus 10 and the network N. The teleconference apparatus 10 may communicate data with another teleconference apparatus 10 via the communication I/F 13.

The communication I/F 13 is an interface for connection between the teleconference apparatus 10 and the terminal devices 20. The teleconference apparatus 10 may communicate with the terminal devices 20 via the communication I/F 13 by way of wireless LAN, Bluetooth, or the like.

The ROM 14 is a nonvolatile semiconductor memory capable of retaining data even at power-off. The RAM 15 is a nonvolatile semiconductor memory that temporarily retains programs and data. The CPU 16 is an arithmetic device that reads programs and data from the auxiliary storage device 17 and the ROM 14 onto the RAM 15, and executes various processing.

The auxiliary storage device 17 is a nonvolatile memory that stores programs and data, for example, a hard disk drive (HDD), a solid state drive (SSD), or the like. Examples of the programs and data stored in the auxiliary storage device 17 include an operating system (OS) as a basic software and programs for achieving this embodiment.

The microphone 18 is equipment that collects sound around the teleconference apparatus 10, and converts the sound into sound data. The speaker 19 is equipment that outputs sound based on the sound data. The microphone 18 and the speaker 19 may not be built in the teleconference apparatus 10, but may be externally connected to the teleconference apparatus 10.

The teleconference apparatus 10 includes the hardware configuration illustrated in FIG. 3 to achieve below-mentioned various processing.

Figure 4:
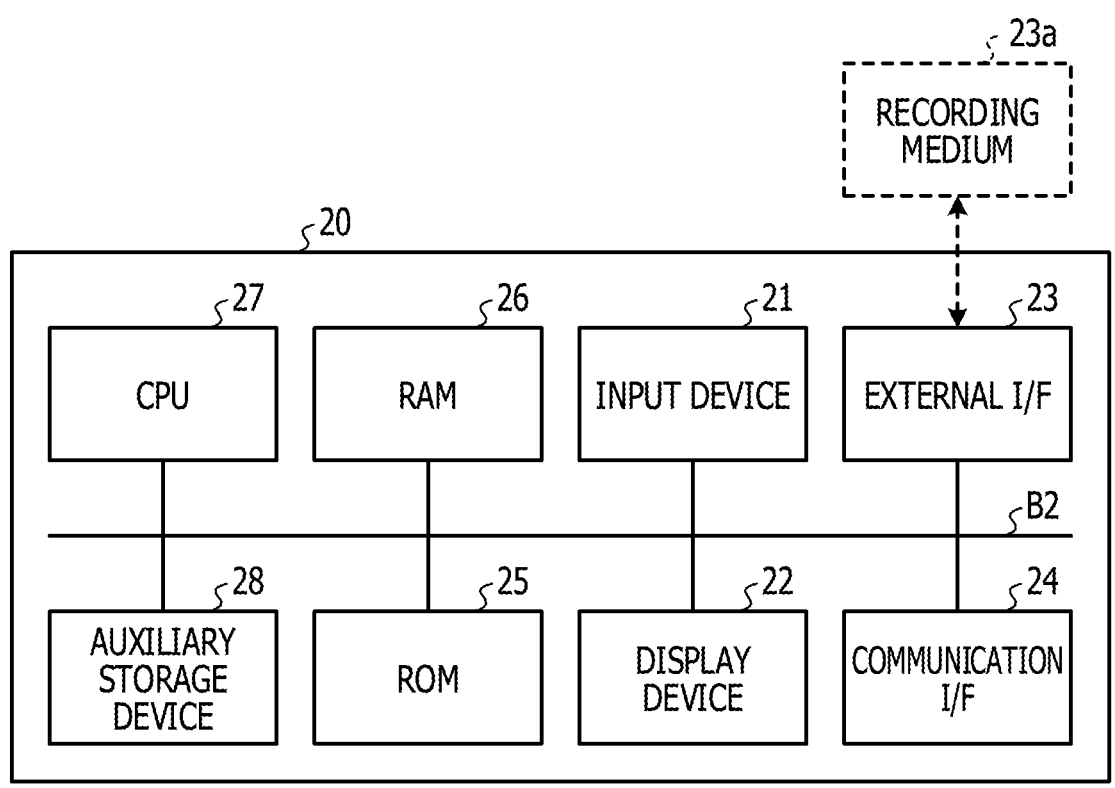
FIG. 4 illustrates an example of hardware configuration of a terminal device.

FIG. 4 illustrates an example of hardware configuration of the terminal device 20.

The terminal device 20 illustrated in FIG. 4 includes an input device 21, a display device 22, an external I/F 23, a communication I/F 24, a ROM 25, a RAM 26, a CPU 27, and an auxiliary storage device 28. Each of the hardware components are interconnected via a bus B2.

The input device 21 is, for example, a keyboard, a mouse, or a touch panel, and is used to input various operational signals to the terminal device 20. The display device 22 is, for example, a display or the like, and displays various processing results of the terminal device 20.

The external I/F 23 is an interface with an external device. Examples of the external device include a recording medium 23a. The terminal device 20 may read and write data and the like from and into the recording medium 23a via the external I/F 23.

Examples of the recording medium 23a include an SD memory card, a USB memory, a compact disk (CD), and a digital versatile disk (DVD).

The communication I/F 24 is an interface for communication between the terminal device 20 and the teleconference apparatus 10. The terminal device 20 may communicate with the teleconference apparatus 10 via the communication I/F 24 by way of wireless LAN, Bluetooth, or the like.

The ROM 25 is a nonvolatile semiconductor memory capable of retaining data even at power-off. The RAM 26 is a nonvolatile semiconductor memory that temporarily retains programs and data. The CPU 27 is an arithmetic device that reads programs and data from the auxiliary storage device 28 and the ROM 25 onto the RAM 26, and executes various processing.

The auxiliary storage device 28 is a nonvolatile memory that stores programs and data, such as an HDD and an SSD. Examples of the programs and data stored in auxiliary storage device 28 include an OS as a basic software, various application programs, and a program for achieving this embodiment.

The terminal devices 20 in this embodiment has the hardware configuration illustrated in FIG. 4 to achieve various processing described later.

Figure 5:
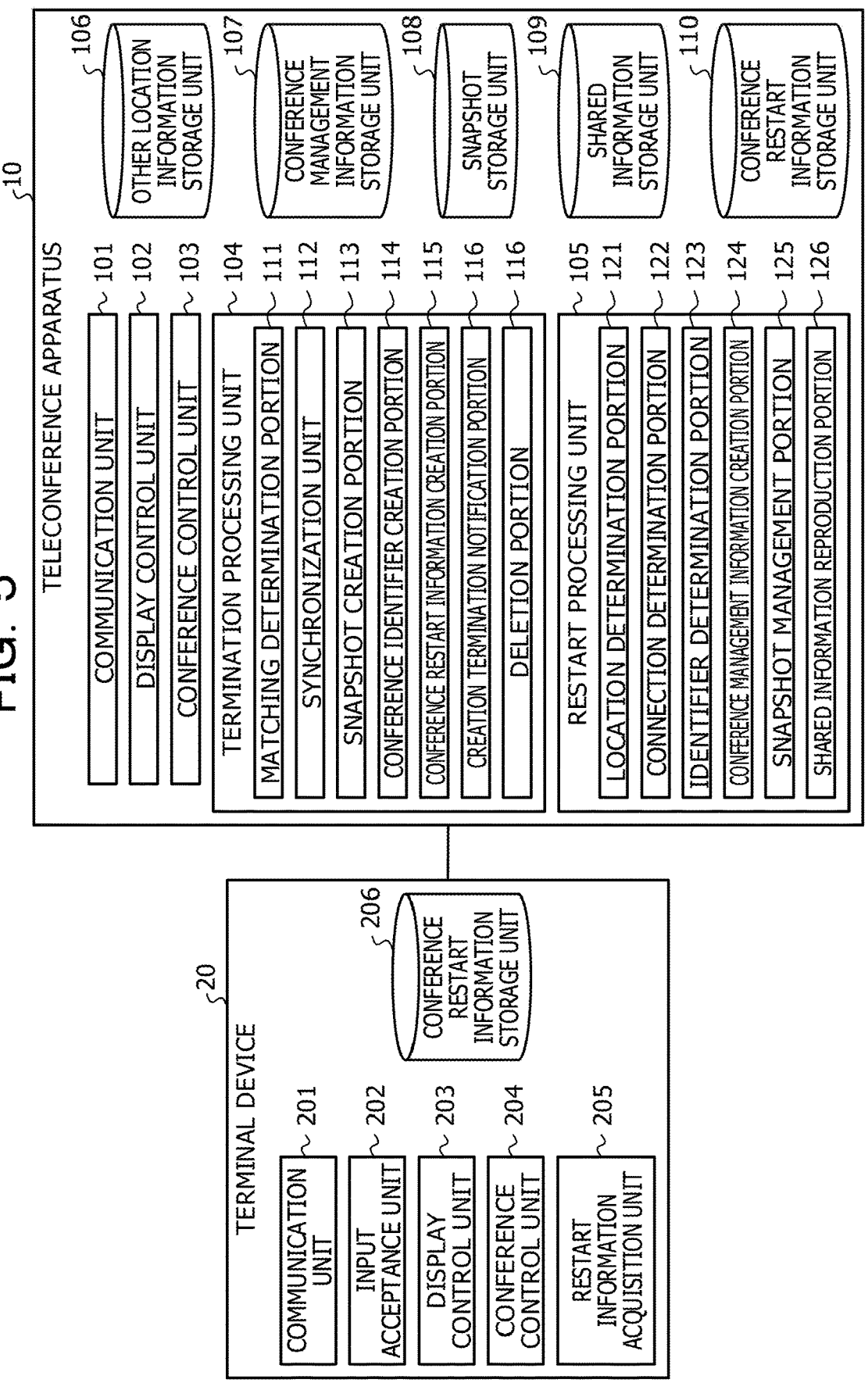
FIG. 5 illustrates an example of an example of functional configuration of the teleconference system.

FIG. 5 illustrates an example of functional configuration of the teleconference system 1.

The terminal device 20 illustrated in FIG. 5 includes a communication unit 201, an input acceptance unit 202, a display control unit 203, a conference control unit 204, and a restart information acquisition unit 205. One or more programs installed into the terminal device 20 allow the CPU 27 to execute the processing, thereby embodying each of these functional units.

The terminal device 20 includes a conference restart information storage unit 206. The storage unit is, for example, an auxiliary storage device 28.

The communication unit 201 transmits and receives various information to and from the teleconference apparatus 10. For example, at termination of the conference, the communication unit 201 receives conference restart information from the teleconference apparatus 10. For example, at restart of the conference, the communication unit 201 transmits the conference restart information to the teleconference apparatus 10.

The input acceptance unit 202 accepts various inputs from the user (conference participants) of the terminal device 20. For example, the input acceptance unit 202 accepts a conference restart instruction from the user.

For example, the input acceptance unit 202 accepts a conference termination instruction from the user. When the input acceptance unit 202 accepts the conference termination instruction, the communication unit 201 transmits information indicating termination of the conference to the teleconference apparatus 10 connected to the terminal device 20.

The display control unit 203 displays various screens. For example, the display control unit 203 displays a screen that allows the user to issue the conference restart instruction (conference restart screen).

The conference control unit 204 executes the processing of holding a conference between the teleconference apparatuses 10 by using the terminal device 20. For example, at restart of the conference, the conference control unit 204 determines whether or not the communication unit 201 has received a participation permission from the teleconference apparatus 10. Then, when the communication unit 201 receives the participation permission from the teleconference apparatus 10, the conference control unit 204 connects the terminal device 20 to the teleconference apparatus 10 through the communication unit 201 to permit participation of the conference.

At termination of the conference, the restart information acquisition unit 205 acquires the conference restart information from the teleconference apparatus 10 via the communication unit 201, in response to notification of the teleconference apparatus 10. The restart information acquisition unit 205 stores the acquired conference restart information in the conference restart information storage unit 206.

The conference restart information storage unit 206 stores the conference restart information acquired by the restart information acquisition unit 205.

The teleconference apparatus 10 illustrated in FIG. 5 includes a communication unit 101, a display control unit 102, a conference control unit 103, a termination processing unit 104, and a restart processing unit 105. One or more programs installed into the teleconference apparatus 10 allow the CPU 16 to execute the processing, thereby embodying each of these functional units.

The teleconference apparatus 10 further includes a location information storage unit 106, a conference management information storage unit 107, a snapshot storage unit 108, a shared information storage unit 109, and a conference restart information storage unit 110. These storage units each may be implemented in, for example, the auxiliary storage device 17. At least one of the storage units may be implemented in a storage device connected to the teleconference apparatus 10 via the network N.

The communication unit 101 transmits and receives various information to and from the terminal devices 20 and another teleconference apparatus 10. For example, at termination of the conference, in response to the terminal devices 20, the communication unit 101 transmits the conference restart information to the terminal devices 20. Further, for example, at restart of the conference, the communication unit 101 receives the conference restart information from the terminal devices 20. Further, for example, at restart of the conference, the communication unit 101 transmits the conference identifier to the other teleconference apparatus 10, and receives the conference identifier from the other teleconference apparatus 10.

The display control unit 102 displays the shared information shared with another teleconference apparatus 10 on the display device 30.

The conference control unit 103 executes the processing of holding a conference with another teleconference apparatus 10. For example, at restart of the conference, the conference control unit 103 causes the communication unit 101 to transmit the participation permission to the terminal devices 20.

At restart of the conference, the conference control unit 103 causes the communication unit 101 to transmit the connection request to hold the conference with another teleconference apparatus 10, to the other teleconference apparatus 10. The connection request is transmitted to the other teleconference apparatus 10, thereby connecting the teleconference apparatus 10 to the other teleconference apparatus 10. The connection between the teleconference apparatus 10 and the other teleconference apparatus 10 enables the conference between the conference locations at which the teleconference apparatuses 10 are installed.

The termination processing unit 104 executes processing about the termination of the conference. The termination processing unit 104 includes a matching determination portion 111, a synchronization portion 112, a snapshot creation portion 113, a conference identifier creation portion 114, a conference restart information creation portion 115, a creation termination notification portion 116, and a deletion portion 117.

At termination of the conference, the matching determination portion 111 determines whether or not shared information matches each other between the teleconference apparatus 10 and the other teleconference apparatus 10 (for example, shared information is the same as each other).

When the matching determination portion 111 determines that shared information does not match each other between the teleconference apparatus 10 and the other teleconference apparatus 10, the synchronization portion 112 synchronizes shared information between these teleconference apparatuses 10.

The snapshot creation portion 113 creates the snapshot from the shared information stored in the shared information storage unit 109. For example, the snapshot creation portion 113 creates the snapshot of the shared information at termination of the conference.

The conference identifier creation portion 114 creates the conference identifier from the snapshot created by the snapshot creation portion 113.

The conference restart information creation portion 115 creates conference restart information including the snapshot created by the snapshot creation portion 113 and the conference identifier created by the conference identifier creation portion 114. Then, the conference restart information creation portion 115 stores the created conference restart information in the conference restart information storage unit 110.

When the conference restart information created by the conference restart information creation portion 115 is stored in the conference restart information storage unit 110, the creation termination notification portion 116 notifies the completion of the creation of the conference restart information to the terminal devices 20 connected to the teleconference apparatus 10.

When the conference held between the teleconference apparatuses 10 is terminated, the deletion portion 117 deletes the conference management information on the conference from the conference management information storage unit 107.

The restart processing unit 105 executes processing about the restart of the conference. The restart processing unit 105 includes a location determination portion 121, a connection determination portion 122, an identifier determination portion 123, a conference management information creation portion 124, a snapshot management portion 125, and a shared information reproduction portion 126.

The location determination portion 121 determines whether the source of the information received by the communication unit 101 is the same conference location or a different conference location.

The connection determination portion 122 determines whether or not the teleconference apparatus 10 is connected to another teleconference apparatus 10 (for example, during the conference).

The identifier determination portion 123 determines whether or not the conference management information including the same conference identifier as the conference identifier received by the communication unit 101 is stored in the conference management information storage unit 107.

When the identifier determination portion 123 determines that the conference management information including the conference identifier is not stored in the conference management information storage unit 107, the conference management information creation portion 124 creates the conference management information including the conference identifier. At this time, according to the determination result of the location determination portion 121, the conference management information creation portion 124 creates conference management information that associates the location ID of the location of its own or the location ID of the location of the source of the conference restart information with the conference identifier.

The conference management information creation portion 124 stores the created conference management information in the conference management information storage unit 107.

When the identifier determination portion 123 determines that the conference management information including the conference identifier is not stored in the conference management information storage unit 107, the snapshot management portion 125 stores the snapshot included in the conference restart information in the snapshot storage unit 108. At this time, the snapshot management portion 125 associates the snapshot with the conference identifier included in the conference restart information, and stores the snapshot in the snapshot storage unit 108.

When the conference is restarted between the teleconference apparatus 10 and another teleconference apparatuses 10, the snapshot management portion 125 acquires the snapshot associated with the conference identifier of the restarted conference from the snapshot storage unit 108.

The shared information reproduction portion 126 creates shared information from the snapshot acquired by the snapshot management portion 125. The shared information reproduction portion 126 stores the created shared information in the shared information storage unit 109. The shared information is stored in the shared information storage unit 109, such that the shared information is shared between the plurality of interconnected teleconference apparatuses 10.

The location information storage unit 106 stores information on another conference location where a conference may be held. FIG. 6 illustrates an example of location information stored in the location information storage unit.

As illustrated in FIG. 6, in the location information stored in the location information storage unit 106 of the teleconference apparatus 10 installed at the conference location A, location names of the other conference locations are associated with the location IDs of the respective conference locations. FIG. 6 illustrates the case where the location ID is an internet protocol (IP) address of the teleconference apparatus 10 installed at the conference location.

The location ID is not limited to the IP address of the teleconference apparatus 10 installed at the conference location. The location ID may be identification information uniquely assigned to the conference location.

As described above, location information storage unit 106 stores location information in which the location names of other conference locations are associated with respective location IDs. At restart of the conference, the teleconference apparatus 10 may refer to the location information stored in the location information storage unit 106 to transmit the conference identifier to the teleconference apparatuses 10 installed at the other conference locations.

The conference management information storage unit 107 stores conference management information indicating information on the conference instructed to be restarted from the user of the terminal device 20. FIG. 7 illustrates an example of the conference management information stored in the conference management information storage unit.

As illustrated in FIG. 7, in the conference management information stored in the conference management information storage unit 107, the conference identifier, the location ID, a connection classification, and a reception date and time are associated with one another. The conference identifier is the conference identifier of the conference instructed to be restarted by the user of the terminal device 20. The location ID is the location ID of the conference location at which the teleconference apparatus 10 connected to the terminal device 20 is installed. That is, the location ID included in the conference management information is the location ID of the conference locations (including the locations of its own) of the source of the conference identifier in the case where the teleconference apparatus 10 receives the conference identifier at restart of the conference.

The connection classification is a classification indicating whether or not the conference instructed to be restarted by the user of the terminal device 20 is being held. The connection classification is "connected", which represents that the conference is being held. The connection classification is "unconnected", which represents that the conference is not held. The reception date and time is date and time when the teleconference apparatus 10 receives the conference identifier.

As described above, the conference management information storage unit 107 stores the conference management information that associates the conference identifier, the location ID, the connection classification, and the reception date and time with each other. At restart of the conference, the teleconference apparatus 10 may refer to the conference management information stored in the conference management information storage unit 107 to perform matching of the conference identifier, thereby restarting the conference with the teleconference apparatus 10 installed at another conference location.

The snapshot storage unit 108 stores the snapshot associated with the conference identifier. The shared information storage unit 109 stores the shared information created from the snapshot. The conference restart information storage unit 110 stores the conference restart information created by the conference restart information creation portion 115.

Figure 8:
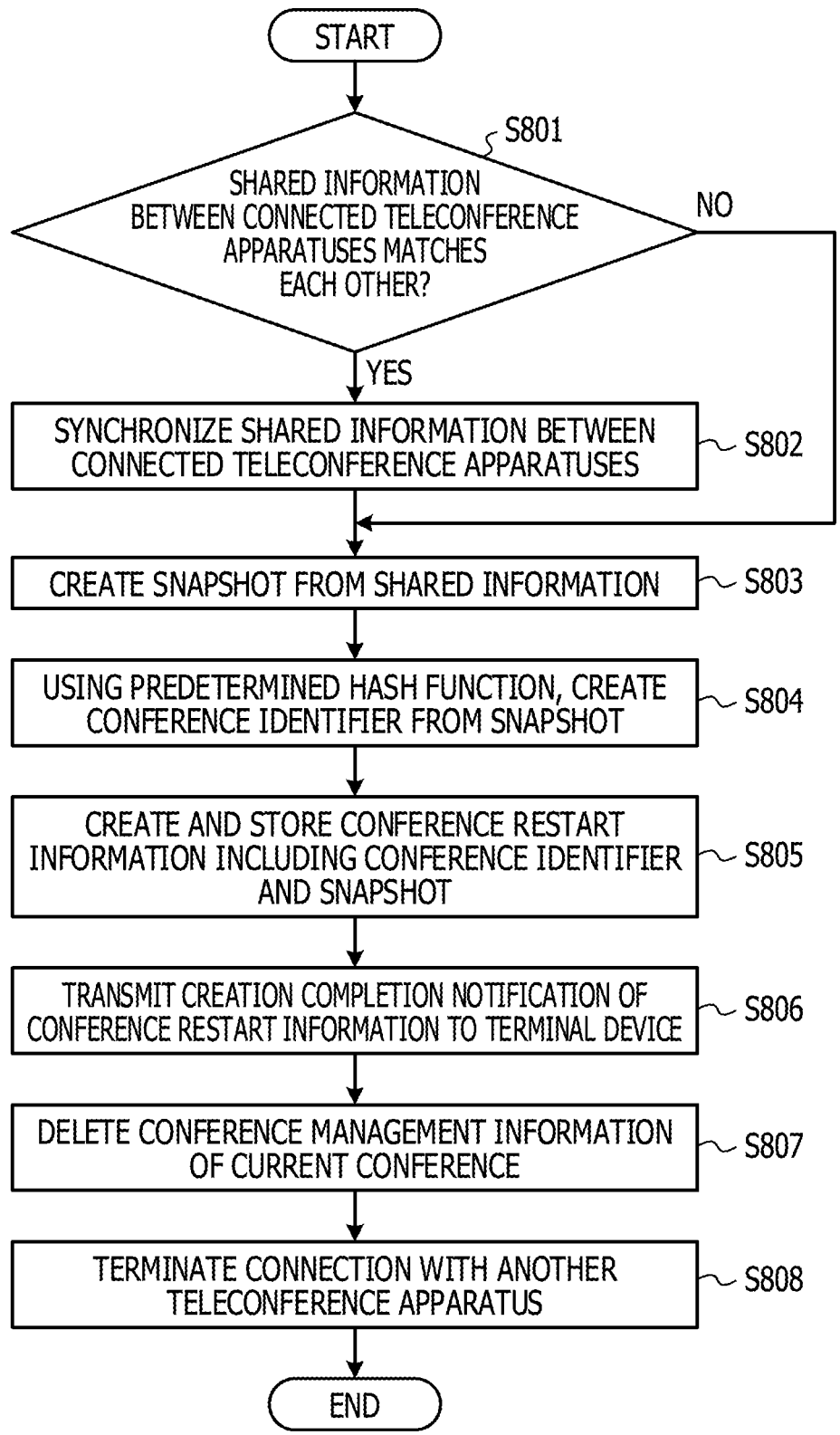
FIG. 8 illustrates an example of processing executed by a teleconference apparatus at termination of the conference.

FIG. 8 illustrates an example of processing executed by the teleconference apparatus at termination of the conference.

The processing illustrated in FIG. 8 is executed when the communication unit 101 of the teleconference apparatus 10 receives information indicating the termination of the conference from the terminal device 20 connected to the teleconference apparatus 10. The processing illustrated in FIG. 8 may be executed when the input device 11 of the teleconference apparatus 10 performs the conference termination operation.

The matching determination portion 111 of the termination processing unit 104 determines whether or not shared information matches each other between the teleconference apparatus 10 and the other connected teleconference apparatus 10 (Step S801). For example, the matching determination portion 111 may check whether or not updated date and time of shared information stored in the shared information storage unit 109 matches each other between the teleconference apparatus 10 and the other connected teleconference apparatus 10, to determine shared information matches each other. Alternatively, the matching determination portion 111 may check whether or not calculation results (hash values) acquired by applying a predetermined hash function to the shared information stored in the shared information storage unit 109 match each other between the teleconference apparatus 10 and the other connected teleconference apparatus 10, to determine shared information matches each other.

When it is determined that the shared information matches each other between the teleconference apparatus 10 and the other connected teleconference apparatus 10 in Step S801, the termination processing unit 104 proceeds to processing in Step S803.

When it is determined that the shared information does not match each other between the teleconference apparatus 10 and the other connected teleconference apparatus 10 in Step S801, the synchronization portion 112 of the termination processing unit 104 synchronizes the shared information between the teleconference apparatus 10 and the other connected teleconference apparatus 10 (Step S802). The synchronization portion 112 uses shared information having the latest updated date and time in the shared information stored in the shared information storage units 109 of the plurality of interconnected teleconference apparatuses 10 to synchronize the shared information between the plurality of teleconference apparatuses 10. The shared information synchronized by the synchronization portion 112 is stored in the shared information storage unit 109.

The snapshot creation portion 113 of the termination processing unit 104 creates the snapshot from the shared information stored in the shared information storage unit 109 (Step S803). As described above, the snapshot refers to information requested for reproducing shared information at termination of the conference. The snapshot includes information such as an electronic file shared by the plurality of teleconference apparatuses 10, notes on the electronic file, displayed positions of the electronic file and the notes on the display devices 30.

The conference identifier creation portion 114 of the termination processing unit 104 creates the conference identifier from the snapshot created by the snapshot creation portion 113 by using a predetermined hash function (Step S804). For example, the conference identifier creation portion 114 sets the hash value of the snapshot as the conference identifier.

The conference identifier creation portion 114 may compress the snapshot created by the snapshot creation portion 113 according to a predetermined compression mode, and defines a hash value of the compressed snapshot as the conference identifier. The conference identifier may be any information that may identify the conference, and is not limited to the hash value of the snapshot. For example, the conference identifier may be any character string determined between the plurality of teleconference apparatuses 10 holding the conference.

The conference restart information creation portion 115 of the termination processing unit 104 creates conference restart information including the snapshot created by the snapshot creation portion 113 and the conference identifier created by the conference identifier creation portion 114. The conference restart information creation portion 115 stores the created conference restart information in the conference restart information storage unit 110 (Step S805).

For example, the conference restart information created by the conference restart information creation portion 115 includes information on attributes of the conference (ex. date and time, and name of the conference). The conference restart information created by the conference restart information creation portion 115 may further include information on conference participants (for example, user IDs and mail addresses of the users participating the conference, and location IDs of the conference locations used by the users). Since the conference restart information includes the information on the conference participants, for example, at restart of the conference, it is possible to issue a notification to induce the users who do not participate in the restarted conference among the users who participated at the previous conference, to participate the restarted conference. In this case, a notification to induce the users to participate the conference at the conference locations used by the users.

The creation termination notification portion 116 of the termination processing unit 104 notifies the completion of the creation of the conference restart information to the terminal devices 20 connected to the teleconference apparatus 10 (Step S806).

For example, it is assumed that three terminal devices 20A (the terminal device 20A-1, the terminal device 20A-2, and the terminal devices 20A-3) are connected to the teleconference apparatus 10A installed at the conference location A. In this case, the creation termination notification portion 116 notifies the completion of the creation of the conference restart information to the terminal devices 20A-1, the terminal devices 20A-2, and the terminal devices 20A-3.

The deletion portion 117 of the termination processing unit 104 deletes the conference management information on the conference with another teleconference apparatuses 10 from conference management information storage unit 107 (Step S807). For example, the deletion portion 117 deletes the conference management information having the connection classification of "connected" from the conference management information storage unit 107.

The conference control unit 103 of the termination processing unit 104 terminates the connection with the other teleconference apparatus 10 (Step S808). For example, the conference control unit 103 causes the communication unit 101 to transmit a connection termination request to the other teleconference apparatus 10, terminating the connection with the other teleconference apparatus 10.

In this manner, the teleconference apparatus 10 may terminate the conference held with the other teleconference apparatus 10. The teleconference apparatus 10 creates the conference restart information including the snapshot of the shared information at termination of the conference, and the conference identifier for identifying the conference. Thereby, the conference participants may use the conference restart information stored in their terminal devices 20 later to restart the conference. The case in which the snapshot of the shared information at termination of the conference is created is described above. However, the timing when the snapshot of the shared information is created is not limited to the case. For example, the snapshot of the shared information at a predetermined time set by the conference participants may be created.

Figure 9:
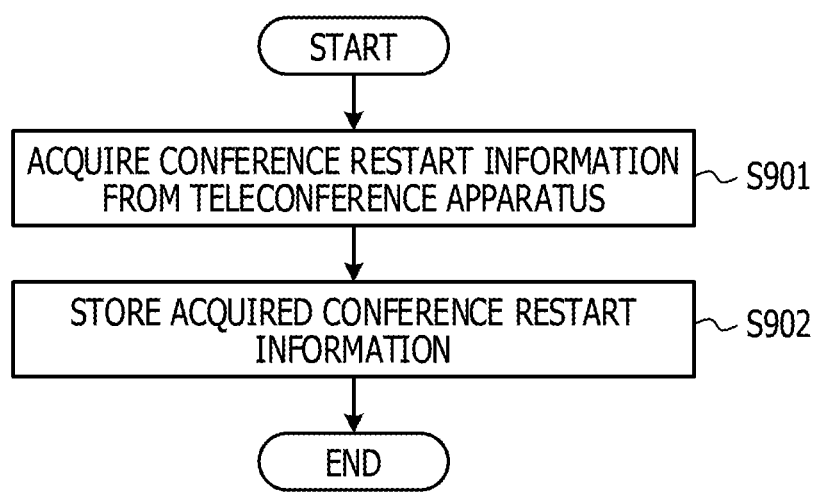
FIG. 9 illustrates an example of processing executed by a terminal device that receives a creation completion notification of conference restart information.

FIG. 9 illustrates an example of processing executed by the terminal device that receives a creation completion notification of the conference restart information.

When the terminal device receives the creation completion notification of the conference restart information from the teleconference apparatus 10, the restart information acquisition unit 205 acquires the conference restart information stored in the conference restart information storage unit 206 of the teleconference apparatus 10 (Step S901). The restart information acquisition unit 205 may cause the communication unit 201 to transmit an acquisition request of the conference restart information to the teleconference apparatus 10, to acquire the conference restart information.

The restart information acquisition unit 205 stores the conference restart information acquired from the teleconference apparatus 10 in the conference restart information storage unit 206 (Step S902).

In this manner, the terminal devices 20 may acquire the conference restart information from the teleconference apparatus 10, and store the conference restart information in the conference restart information storage unit 206. Thereby, the conference participants may use the conference restart information stored in their terminal devices 20 to restart the conference.

Figure 10:
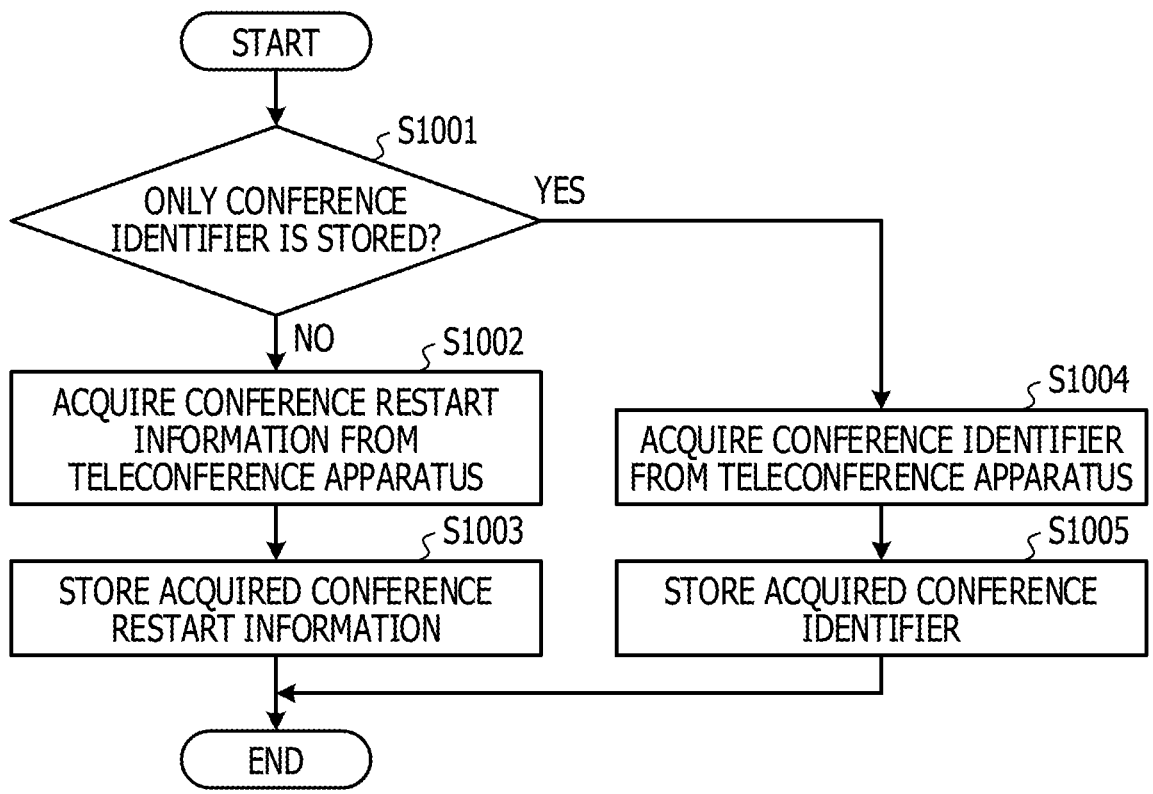
FIG. 10 illustrates an example of processing executed by the terminal device that receives the creation completion notification of the conference restart information.

In FIG. 9, all of the terminal devices 20 connected to the teleconference apparatus 10 acquire and store the conference restart information. For example, only a certain terminal device 20 among the terminal devices 20 connected to the teleconference apparatus 10 may acquire and store the conference restart information, while remaining terminal devices 20 may acquire and store only the conference identifier. FIG. 10 illustrates an example of processing executed by the terminal device that receives the creation completion notification of the conference restart information.

The restart information acquisition unit 205 determines whether or not only the conference identifier is stored (Step S1001). For example, the restart information acquisition unit 205 may determine it using a result of an inquiry to the user of the terminal device 20 about whether the snapshot of the conference is stored, or may determine whether or not only the conference identifier is stored based on setting information of the terminal device 20. For example, the restart information acquisition unit 205 may determine whether or not only the conference identifier is stored based on free space of the auxiliary storage device 28 of the terminal device 20.

When it is not determined that only the conference identifier is stored in Step S1001, the restart information acquisition unit 205 acquires the conference restart information from the teleconference apparatus 10 that is the source of the creation completion notification of the conference restart information (Step S1002).

The restart information acquisition unit 205 stores the conference restart information acquired from the teleconference apparatus 10 in the conference restart information storage unit 206 (Step S1003).

When it is determined that only the conference identifier is stored in Step S1001, the restart information acquisition unit 205 acquires the conference identifier from the teleconference apparatus 10 that is the source of the creation completion notification of the conference restart information (Step S1004). For example, the restart information acquisition unit 205 acquires the conference identifier included in the conference restart information stored in the conference restart information storage unit 206 of the teleconference apparatus 10. For example, the restart information acquisition unit 205 may cause the communication unit 201 to transmit the acquisition request of the conference identifier to the teleconference apparatus 10, thereby acquiring the conference identifier.

The restart information acquisition unit 205 stores the conference identifier acquired from the teleconference apparatus 10 in the conference restart information storage unit 206 (Step S1005).

In this manner, the terminal devices 20 may acquire the conference restart information or the conference identifier, and store the conference restart information or the conference identifier in the conference restart information storage unit 206. Thereby, for example, the terminal device 20 used by a chair person or a secretary of the conference may store the conference restart information, while the terminal devices 20 used by general participants may store only the conference identifier. For example, the terminal device 20 having small free space of the auxiliary storage device 28 may store only the conference identifier.

Figure 11:
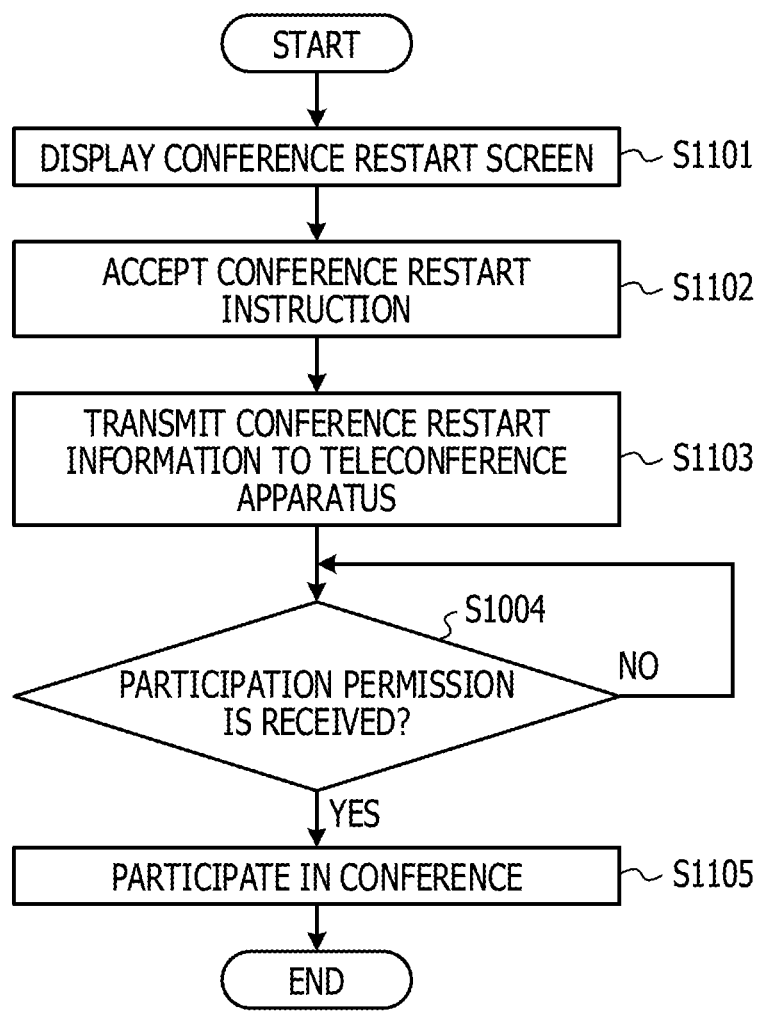
FIG. 11 illustrates an example of processing executed by the terminal device at restart of the conference.

FIG. 11 illustrates an example of processing executed by the terminal device at restart of the conference.

Figure 12:
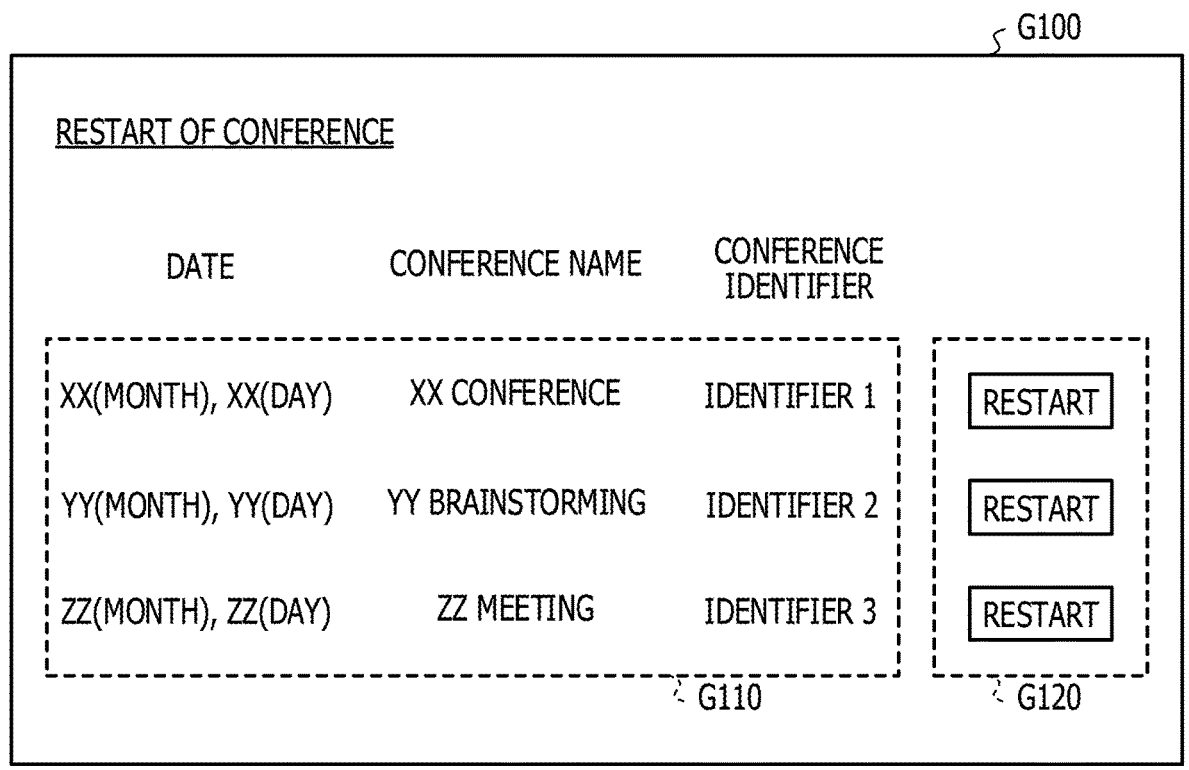
FIG. 12 illustrates an example of a conference restart screen.

The display control unit 203 displays the conference restart screen that allows the user to issue the conference restart instruction (Step S1101). Here, an example of the conference restart screen displayed by the display control unit 203 is illustrated in FIG. 12. FIG. 12 illustrates the example of the conference restart screen.

A conference restart screen G100 illustrated in FIG. 12 includes a conference list G110 and a restart button G120. Conference information including date and time, a conference name, and the conference identifier of the conference is displayed in the conference list G110 in the form of a list. The restart button G120 includes buttons (displayed parts) associated with the conference information included in the conference list G110. The conference information included in the conference list G110 consists of information on attributes of the conference included in the conference restart information stored in the conference restart information storage unit 206 (date and time, and name of the conference), and the conference identifier. In the case where the conference identifier is previously associated with time and/or place in a schedule management application, the conference identifier may be automatically selected from time and/or place.

The user may press the restart button G120 corresponding to conference information of the conference to be restarted, in the conference information included in the conference list G110, to issue the conference restart instruction. Hereinafter, it is assumed that the user presses the restart button G120 to issue the conference restart instruction.

The input acceptance unit 202 accepts the conference restart instruction from the user (Step S1102).

The conference control unit 204 acquires the conference restart information corresponding to the conference restart instruction accepted by the input acceptance unit 202, from the conference restart information storage unit 206. Then, the conference control unit 204 causes the communication unit 201 to transmit the acquired conference restart information to the teleconference apparatus 10 (Step S1103).

The conference control unit 204 determines whether or not the participation permission to participate in the conference is received from the teleconference apparatus 10 (Step S1104).

When the participation permission is not received from the teleconference apparatus 10 in Step S1104, the conference control unit 204 returns to Step S1104. For example, the conference control unit 204 is put into a waiting state (participation permission waiting state) until reception of the participation permission from the teleconference apparatus 10.

When the participation permission is received from the teleconference apparatus 10 in Step S1104, the conference control unit 204 participates in the conference (Step S1105). That is, the conference control unit 204 causes the communication unit 201 to be connected to the teleconference apparatus 10 that is the source of the participation permission, thereby participating in the conference.

In this manner, the terminal devices 20 may transmit the conference restart information to the teleconference apparatus 10 and when receiving the participation permission, restart the conference from the teleconference apparatus 10.

Figure 13:
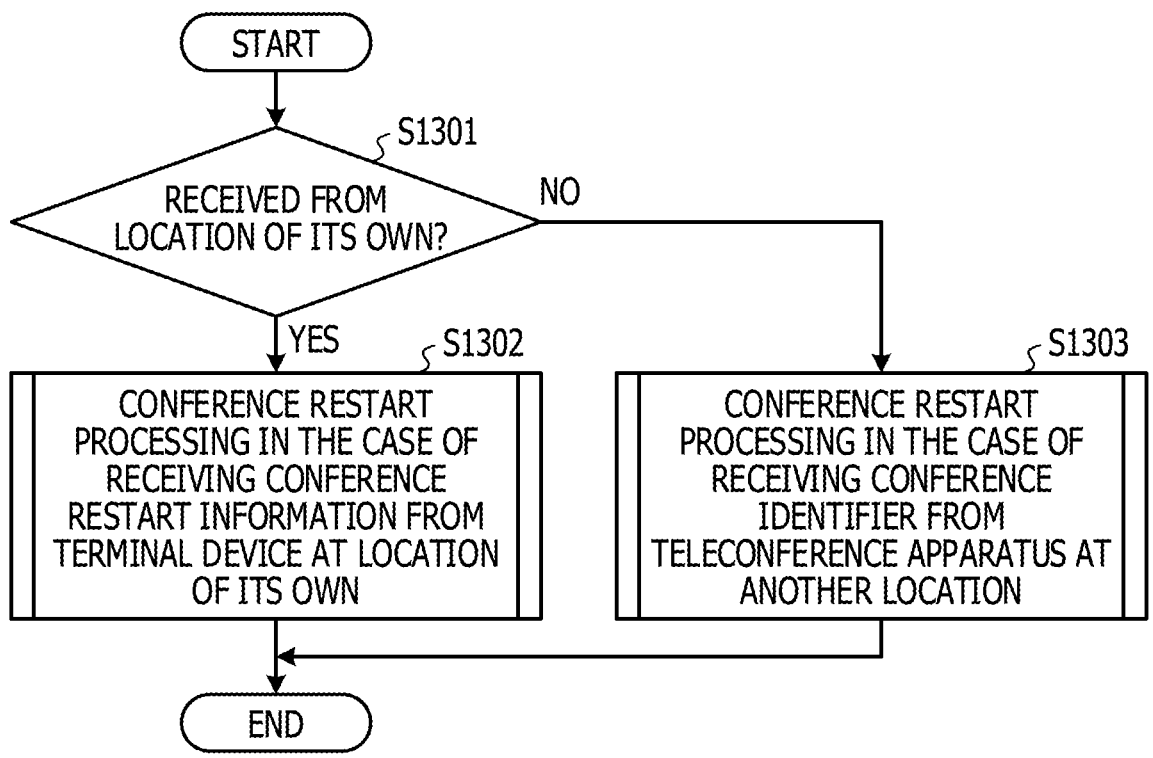
FIG. 13 illustrates an example of processing executed by the teleconference apparatus that receives the conference restart information or a conference identifier.

FIG. 13 illustrates an example of processing executed by the teleconference apparatus that receives the conference restart information or the conference identifier. As described with reference to FIG. 2, at restart of the conference, each teleconference apparatus 10 receives the conference restart information from the terminal device 20 located at the same conference location or the conference identifier from another teleconference apparatus 10 located at another conference location. In other words, at restart of the conference, each teleconference apparatus 10 receives at least the conference identifier from the terminal device 20 located at the same conference location or another teleconference apparatus 10 located at another conference location.

The location determination portion 121 of the restart processing unit 105 determines whether or not information received by the communication unit 101 (the conference restart information or the conference identifier) is information received from the location of its own (Step S1301). In other words, since the conference restart information includes the conference identifier, in Step S1301, the location determination portion 121 determines whether or not the conference identifier received by the communication unit 101 is information received from the location of its own.

When it is determined that information received by the communication unit 101 is information received from the location of its own (for example, when the conference restart information is received from the terminal device 20) in Step S1301, the restart processing unit 105 executes conference restart processing in the case of receiving the conference restart information from the terminal device 20 at the location of its own (Step S1302).

When it is not determined that information received by the communication unit 101 is information received from the location of its own (for example, the conference identifier is received from another teleconference apparatuses 10) in Step S1301, the restart processing unit 105 executes conference restart processing in the case of receiving the conference identifier from another teleconference apparatus 10 at another location (Step S1303).

Figure 14A:
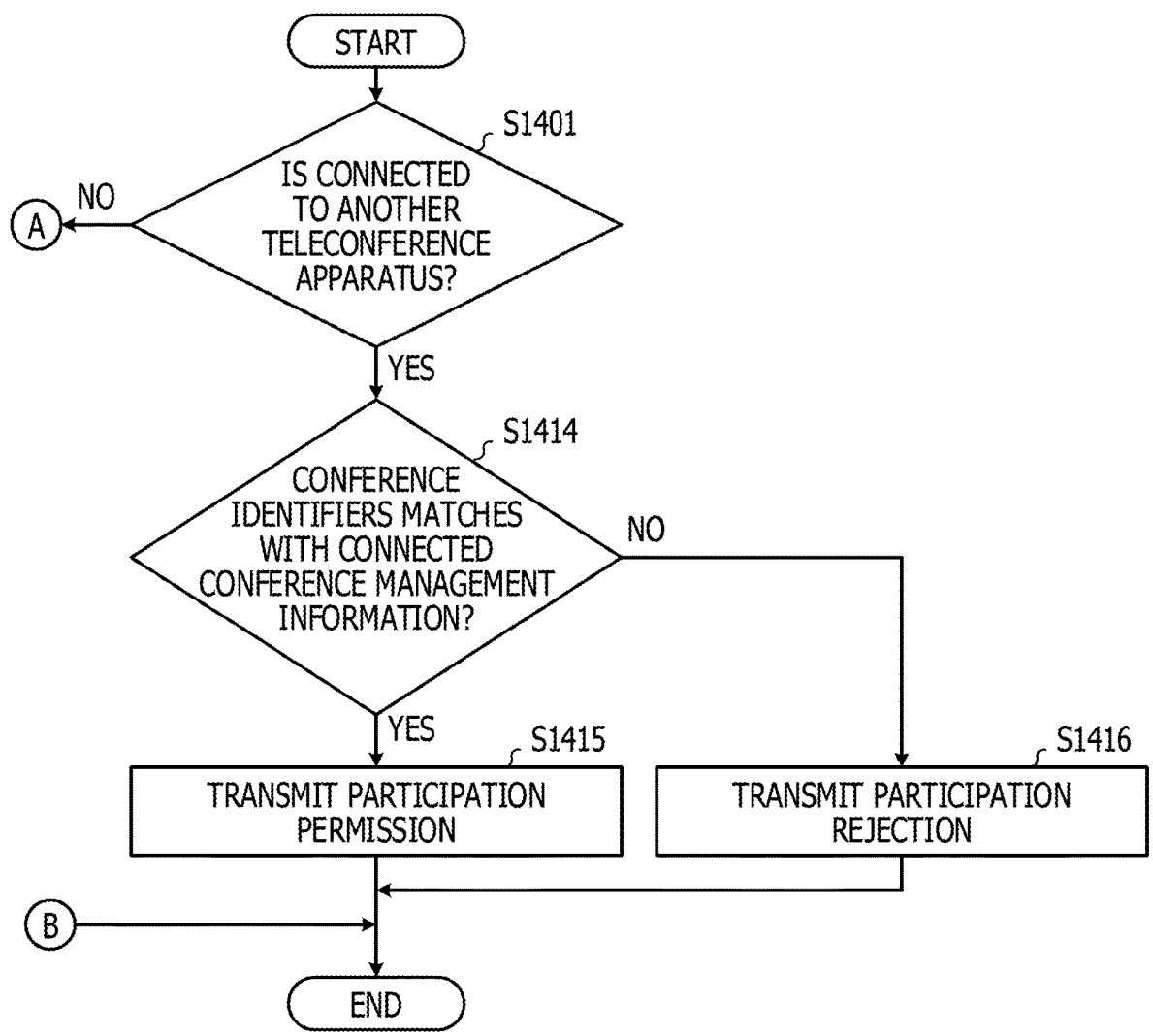
FIGS. 14A and 14B illustrate an example of conference restart processing in the case of receiving the conference restart information from the terminal device at the location of its own.
Figure 14B:
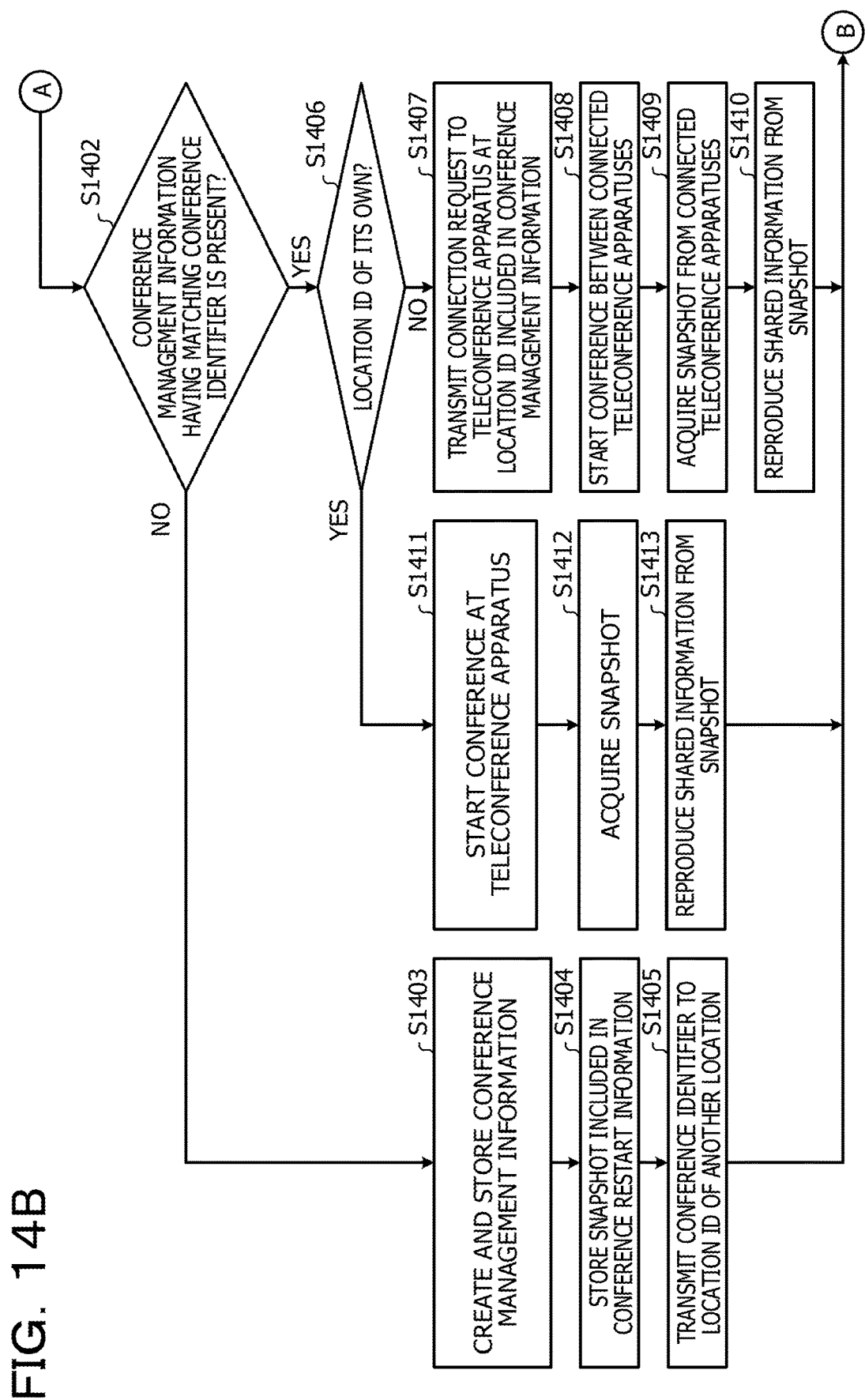

FIGS. 14A and 14B illustrate an example of the conference restart processing in the case of receiving the conference restart information from the terminal device at the location of its own. The processing illustrated in FIGS. 14A and 14B corresponds to the processing in Step S1302.

The connection determination portion 122 of the restart processing unit 105 determines whether or not the teleconference apparatus 10 is connected to another teleconference apparatus 10 (for example, the conference is being held the teleconference apparatus 10 and another teleconference apparatuses 10) (Step S1401).

When it is determined that the teleconference apparatus 10 is not connected to another teleconference apparatuses 10 in Step S1401, the identifier determination portion 123 determines whether or not conference management information including the same conference identifier as the conference identifier of the conference restart information received by the communication unit 101 is present (Step S1402). For example, the identifier determination portion 123 determines whether or not the conference management information including the same conference identifier as the conference identifier included in the conference restart information is stored in the conference management information storage unit 107.

When it is determined that the conference management information having the same conference identifier is not present in Step S1402, the conference management information creation portion 124 creates conference management information including the conference identifier, the location ID of the location of its own, the connection classification "unconnected", and reception date and time of the conference restart information. Then, the conference management information creation portion 124 stores the created conference management information in the conference management information storage unit 107 (Step S1403).

The snapshot management portion 125 stores the snapshot included in the conference restart information received by the communication unit 101 in the snapshot storage unit 108 (Step S1404).

The communication unit 101 refers to another location information stored in the location information storage unit 106, and transmits the conference identifier to the location ID of another location (Step S1405). For example, the communication unit 101 transmits the conference identifier included in the conference management information that is created and stored in Step S1403, to the location ID included in the location information stored in the location information storage unit 106. Thereby, the conference identifier is transmitted to one or more predetermined other conference locations. At this time, the teleconference apparatus 10 waits restart of the conference having the conference identifier (that is, waits a connection request from the other teleconference apparatus 10).

When it is determined that conference management information including the same conference identifier is present in Step S1402 is present, the conference control unit 103 determines whether or not the location ID included in the conference management information is the location ID of the location of its own (Step S1406).

When it is determined that the location ID included in the conference management information is different form the location ID of the location of its own in Step S1406, the conference control unit 103 causes the communication unit 101 to transmit the connection request to the other teleconference apparatus 10 having the location ID included in the conference management information (Step S1407). Thereby, the teleconference apparatus 10 is connected to the other teleconference apparatus 10 located at the conference location having the location ID to restart the conference between the teleconference apparatuses 10. At this time, the conference control unit 103 updates the connection classification included in the conference management information to "connected".

The conference control unit 103 starts processing about the conference held with the connected other teleconference apparatuses 10 (Step S1408). At this time, the conference control unit 103 causes the communication unit 101 to transmit the participation permission to the terminal device 20 in the participation permission waiting state among the terminal devices 20 at the same conference location. Thereby, the user may use his/her terminal devices 20 to participate in the conference.

The snapshot management portion 125 of the restart processing unit 105 acquires the snapshot from the connecting terminal devices 20 or the other teleconference apparatuses 10 connected in Step S1407 (Step S1409). For example, the snapshot management portion 125 acquires the snapshot associated with the conference identifier of the restarted conference from the connecting terminal device 20 when the terminal device 20 has the snapshot, and acquires the snapshot from the snapshot storage unit 108 of the other teleconference apparatus 10 when the terminal device 20 does not have the snapshot. The snapshot management portion 125 may transmit the snapshot acquisition request that designates the conference identifier to the other teleconference apparatus 10 to acquire the snapshot associated with the conference identifier.

The snapshot management portion 125 stores the acquired snapshot in the snapshot storage unit 108.

The shared information reproduction portion 126 of the restart processing unit 105 creates shared information from the snapshot acquired by the snapshot management portion 125 (Step S1410). The shared information reproduction portion 126 stores the created shared information in the shared information storage unit 109. Thereby, the display control unit 102 displays shared information (for example, shared information at termination of the previous conference) on the display device 30.

The shared information reproduction portion 126 may execute processing that is the reverse of processing executed by the snapshot creation portion 113 (processing of creating the snapshot from the shared information) to create the shared information from the snapshot.

When it is determined that the location ID included in the conference management information is the location ID of the locations of its own in Step S1406, the conference control unit 103 starts a conference at the teleconference apparatus 10 (Step S1411). For example, the conference control unit 103 starts the conference between the terminal devices 20 at the same conference location without being connected to the other teleconference apparatus 10. At this time, the conference control unit 103 causes the communication unit 101 to transmit the participation permission to the terminal device 20 in the participation permission waiting state among the terminal devices 20 at the same conference location.

The snapshot management portion 125 of the restart processing unit 105 acquires the snapshot from the snapshot storage unit 108 (Step S1412). For example, the snapshot management portion 125 acquires the snapshot associated with the conference identifier of the restarted conference from the snapshot storage unit 108.

The shared information reproduction portion 126 of the restart processing unit 105 creates the shared information from the snapshot acquired by the snapshot management portion 125 (Step S1413). The shared information reproduction portion 126 stores the created shared information in the shared information storage unit 109. Thereby, the display control unit 102 displays shared information (for example, shared information at termination of the previous conference) on the display device 30.

When it is determined that the teleconference apparatus 10 is connected to another teleconference apparatus 10 in Step S1401, the identifier determination portion 123 determines whether or not the conference identifier included in the conference restart information received by the communication unit 101 matches with the conference identifier in the conference management information having the connection classification "connected" (Step S1414). For example, the identifier determination portion 123 determines whether or not the conference identifier included in the conference restart information received by the communication unit 101 is the same as the conference identifier in the conference management information having the connection classification "connected" in the conference management information stored in the conference management information storage unit 107.

When it is determined that the conference identifiers match with each other in Step S1414, the conference control unit 103 causes the communication unit 101 to transmit the participation permission to the terminal device 20 in the participation permission waiting state among the terminal devices 20 at the same conference locations (Step S1415). Thereby, the terminal device 20 in the participation permission waiting state may participate in the restarted conference.

When it is determined that the conference identifiers do not match with each other in Step S1414, the conference control unit 103 causes the communication unit 101 to transmit a participation rejection to the terminal device 20 in the participation permission waiting state in the terminal devices 20 in the same conference locations (Step S1416). This is due to that the terminal device 20 in the participation permission waiting state transmits the conference restart information including the conference identifier that is different from the conference identifier of the already-restarted conference to the teleconference apparatus 10.

In this manner, when receiving the conference restart information from the terminal device 20 in the same conference locations, the teleconference apparatus 10 executes processing of restarting the conference between the same conference locations or between different conference locations.

FIG. 15 illustrates an example of the conference restart processing of receiving the conference identifier from the teleconference apparatus located at another location. The processing illustrated in FIG. 15 corresponds to the processing in Step S1303.

The connection determination portion 122 of the restart processing unit 105 determines whether or not the teleconference apparatus 10 is connected to another teleconference apparatus 10 (for example, the conference is being held between the teleconference apparatus 10 and another teleconference apparatus 10) (Step S1501).

When it is determined that the teleconference apparatus 10 is connected to another teleconference apparatus 10 in Step S1501, the identifier determination portion 123 determines whether or not the conference management information including the same conference identifier as the conference identifier received by the communication unit 101 is present (Step S1502). For example, the identifier determination portion 123 determines whether or not the conference management information including the conference identifier is stored in the conference management information storage unit 107.

When it is determined that the conference management information including the same conference identifier is not present in Step S1502, the conference management information creation portion 124 creates the conference management information including the conference identifier, the location ID of the conference location as the source of the conference identifier, the connection classification "unconnected", and reception date and time of the conference identifier. Then, conference management information creation portion 124 stores the created conference management information in the conference management information storage unit 107 (Step S1503).

When it is determined that the conference management information including the matching conference identifier is present in Step S1502, the conference control unit 103 causes the communication unit 101 to transmit the connection request to the other teleconference apparatus 10 installed at the conference location as the source of the conference identifier (Step S1504). Thereby, the teleconference apparatus 10 is connected to the other teleconference apparatuses 10 to restart the conference therebetween. At this time, the conference control unit 103 updates the connection classification included in the conference management information to "connected".

The conference control unit 103 starts processing about the conference with the other connected teleconference apparatus 10 (Step S1505). At this time, the conference control unit 103 causes the communication unit 101 to transmit the participation permission to the terminal device 20 in the participation permission waiting state in the terminal devices 20 at the same conference locations. Thereby, the user may use his/her terminal device 20 to participate in the conference.

The snapshot management portion 125 of the restart processing unit 105 acquires the snapshot from the other teleconference apparatus 10 connected Step S1505 (Step S1506). That is, the snapshot management portion 125 acquires the snapshot associated with the conference identifier of the restarted conference from the snapshot storage unit 108 of the other teleconference apparatus 10. The snapshot management portion 125 may transmit a snapshot acquisition request that designate the conference identifier to the other teleconference apparatus 10, thereby acquiring the snapshot associated with the conference identifier.

The snapshot management portion 125 stores the acquired snapshot in the snapshot storage unit 108.

The shared information reproduction portion 126 of the restart processing unit 105 creates the shared information from the snapshot acquired from the snapshot management portion 125 (Step S1507). The shared information reproduction portion 126 stores the created shared information in the shared information storage unit 109. Thereby, the display control unit 102 displays shared information (for example, shared information at termination of the previous conference) on the display device 30.

When it is determined that the teleconference apparatus is connected to another teleconference apparatus 10 in Step S1501, the identifier determination portion 123 determines whether or not the conference identifier received by the communication unit 101 matches with the conference identifier included in the conference management information having the connection classification "connected" (Step S1508). That is, the identifier determination portion 123 determines whether or not the conference identifier received by the communication unit 101 is the same as the conference identifier of the conference management information having the connection classification "connected" in the conference management information stored in the conference management information storage unit 107.

When it is determined that the conference management information including a matching conference identifier is not present in Step S1508, the conference management information creation portion 124 creates conference management information including the conference identifier, the location ID of the source, the connection classification "unconnected", the reception date and time of the conference restart information. Then, the conference management information creation portion 124 stores the created conference management information in the conference management information storage unit 107 (Step S1509).

When it is determined that the conference management information including the matching conference identifier is present in Step S1508, the conference control unit 103 causes the communication unit 101 to transmit the connection request to the other teleconference apparatus 10 installed at the conference location as the source of the conference identifier (Step S1510). Thereby, teleconference apparatus 10 is connected to the other teleconference apparatuses 10 to restart the conference therebetween.

The conference control unit 103 starts processing about the conference with the other connected teleconference apparatus 10 (Step S1511). At this time, the conference control unit 103 causes the communication unit 101 to transmit the participation permission to the terminal device 20 in the participation permission waiting state among the terminal devices 20 at the same conference location. Thereby, the user may use his/her terminal device 20 to participate in the conference.

The shared information reproduction portion 126 of the restart processing unit 105 transmits the current shared information (that is, the shared information stored in the shared information storage unit 109) to the other teleconference apparatus 10 as the source of the conference identifier (Step S1512). Thereby, the shared information is shared with the other teleconference apparatus 10.

In this manner, when receiving conference identification information from the other teleconference apparatus 10, the teleconference apparatus 10 executes processing of restarting the conference with the other teleconference apparatus 10.

In FIGS. 13 to 15, the terminal devices 20 transmits the conference restart information to the teleconference apparatus 10 and however, the terminal device 20 may not store the snapshot. The terminal devices 20 that does not store the snapshot may transmit the conference identifier to the teleconference apparatus 10.

As described above, the teleconference system 1 performs matching between the plurality of teleconference apparatuses 10 by using the conference identifiers included in the conference restart information transmitted from the terminal devices 20. The teleconference system 1 interconnects the teleconference apparatuses 10 that store the conference management information including the same conference identifier to hold a conference. At this time, the teleconference system 1 reproduces the shared information at termination of the previous conference from the snapshot at termination of the previous conference. Thereby, the teleconference system 1 may readily reproduce the shared information and restart the conference.

Each teleconference apparatus 10 stores the conference management information to perform matching between the conference identifiers. However, for example, one server that may communicate with each teleconference apparatus 10 may perform matching between the conference identifiers.

The teleconference apparatuses 10 that store the same conference identifier are interconnected herein. However, for example, using the conference identifier as an electronic tally, the teleconference apparatuses 10 that store the respective electronic tallies may be interconnected. Thereby, only when a predetermined electronic tallies match each other, the teleconference apparatus 10 that store the electronic tallies are interconnected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
   store, in the memory, a second identifier to identify a conference with another information processing apparatus, which is coupled to the information processing apparatus for the conference, and a location identifier to identify a location of the conference in association with each other;
   acquire, from one or more terminals coupled to the information processing apparatus, a first snapshot of shared information which is shared with the another information processing apparatus at a time during the conference and a first identifier to identify the conference;
   determine whether or not the first identifier matches the second identifier stored in the memory by referring to the memory;
   when determining that the first identifier matches the second identifier stored in the memory, determine whether or not the location identifier for the second identifier matches a location identifier for the information processing apparatus;
   when determining that the location identifier for the second identifier does not match the location identifier for the information processing apparatus, perform coupling to the another information processing apparatus that is a source of the second identifier stored in the memory and acquire a second snapshot from the another information processing apparatus; and
   reproduce the shared information shared with the coupled another information processing apparatus from one of the first snapshot and the second snapshot.

2. The information processing apparatus according to claim 1, wherein when determining that the first identifier does not match the second identifier stored in the memory, the processor transmits the first identifier to the another information processing apparatus.

3. The information processing apparatus according to claim 2, wherein when determining that the first identifier does not match the second identifier stored in the memory, the processor stores the first identifier in the memory.

4. An information processing system comprising:
   a plurality of information processing apparatuses; and
   one or more terminals coupled to the plurality of information processing apparatuses and each including a first memory that stores a first snapshot of shared information which is shared by the plurality of information processing apparatuses at a time during a conference, and a first identifier to identify the conference, each of the plurality of information processing apparatuses is configured to:
   store, in a second memory, a second identifier to identify a conference with another information processing apparatus, which is coupled to the information processing apparatus for the conference, and a location identifier to identify a location of the conference in association with each other;
   acquire the first snapshot and the first identifier from the terminals;
   determine whether or not the first identifier matches the second identifier stored in the second memory by referring to the second memory;
   when determining that the first identifier matches the second identifier stored in the second memory, determine whether or not the location identifier for the second identifier matches a location identifier for the information processing apparatus;
   when determining that the location identifier for the second identifier does not match the location identifier for the information processing apparatus, preform coupling to the another information processing apparatus as a source of the second identifier stored in the second memory and acquire a second snapshot from the another information processing apparatus; and
   reproduce the shared information shared with the coupled another information processing apparatus from one of the first snapshot and the second snapshot.

5. The information processing system according to claim 4, wherein when determining that the first identifier does not match the second identifier stored in the memory, the plurality of information processing apparatus transmit the first identifier to the another information processing apparatus.

6. The information processing system according to claim 5, wherein when determining that the first identifier does not match the second identifier stored in the memory, the plurality of information processing apparatus store the first identifier in the memory.

7. An information processing method comprising:
   storing, in a memory, a second identifier to identify a conference with another information processing apparatus, which is coupled to an information processing apparatus for the conference, and a location identifier to identify a location of the conference in association with each other;
   acquiring, by a computer, from one or more terminals coupled to the information processing apparatus, a first snapshot of shared information which is shared with the another information processing apparatus at a time during the conference and a first identifier to identify the conference;
   determining whether or not the first identifier matches the second identifier stored in the memory by referring to the memory;
   when determining that the first identifier matches the second identifier stored in the memory, determining whether or not the location identifier for the second identifier matches a location identifier for the information processing apparatus;
   when determining that the location identifier for the second identifier does not match the location identifier for the information processing apparatus, performing coupling to the another information processing apparatus that is a source of the second identifier stored in the memory and acquiring a second snapshot from the another information processing apparatus; and
   reproducing the shared information shared with the coupled another information processing apparatus from one of the first snapshot and the second snapshot.

8. The information processing method according to claim 7, wherein when determining that the first identifier does not match the second identifier stored in the memory, the first identifier is transmitted to the another information processing apparatus.

9. The information processing method according to claim 8, wherein when determining that the first identifier does not match the second identifier stored in the memory, the first identifier is stored in the memory.

\* \* \* \* \*